US010313581B2

(12) United States Patent
Fujimura et al.

(10) Patent No.: US 10,313,581 B2
(45) Date of Patent: Jun. 4, 2019

(54) SETTING DEVICE AND CAMERA

(71) Applicant: FUJIFILM Corporation, Tokyo (JP)

(72) Inventors: Yuichi Fujimura, Saitama (JP);
Takeshi Misawa, Saitama (JP);
Kentaro Tokiwa, Saitama (JP);
Hirofumi Horii, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/134,239

(22) Filed: Sep. 18, 2018

(65) Prior Publication Data

US 2019/0020812 A1  Jan. 17, 2019

Related U.S. Application Data

(63) Continuation of application No. PCT/JP2017/010235, filed on Mar. 14, 2017.

(30) Foreign Application Priority Data

Mar. 23, 2016 (JP) .................................. 2016-057801

(51) Int. Cl.
H04N 5/232 (2006.01)
G05G 1/10 (2006.01)
(Continued)

(52) U.S. Cl.
CPC ......... *H04N 5/23216* (2013.01); *G03B 17/02* (2013.01); *G03B 17/18* (2013.01);
(Continued)

(58) Field of Classification Search
CPC ....... H04N 5/23216; G05G 1/08; G05G 1/105
See application file for complete search history.

(56) References Cited

U.S. PATENT DOCUMENTS

2006/0146165 A1  7/2006 Hagiwara et al.
2015/0109510 A1* 4/2015 Fujita ..................... G03B 17/02
                                                          348/333.02

FOREIGN PATENT DOCUMENTS

JP   6-148712 A   5/1994
JP   9-133961 A   5/1997
(Continued)

OTHER PUBLICATIONS

International Preliminary Report on Patentability (Form PCT/IPEA/409) for International Application No. PCT/JP2017/010235, dated Mar. 22, 2018, with English translation.

(Continued)

*Primary Examiner* — Minh Q Phan
(74) *Attorney, Agent, or Firm* — Birch, Stewart, Kolasch & Birch, LLP

(57) ABSTRACT

There are provided a setting device and a camera that allow a user to easily grasp settable conditions with a compact structure. A display section is provided on the upper surface of a sensitivity dial. Sensitivities are switched according to the rotation of the sensitivity dial. A display on the display section is switched according to the switching of sensitivities. A currently selected sensitivity is displayed on the display section at a set value-display position Po. The maximum value of a settable sensitivity is displayed at a maximum value-display position Pmax, and the minimum value thereof is displayed at a minimum value-display position Pmin.

9 Claims, 28 Drawing Sheets

(51) Int. Cl.
  *G03B 17/02* (2006.01)
  *G03B 17/18* (2006.01)
  *G05G 1/08* (2006.01)
(52) U.S. Cl.
  CPC ....... *H04N 5/232* (2013.01); *G03B 2217/002* (2013.01); *G05G 1/08* (2013.01)

(56) References Cited

FOREIGN PATENT DOCUMENTS

| | | |
|---|---|---|
| JP | 2006-191301 A | 7/2006 |
| JP | 2008-165118 A | 7/2008 |

OTHER PUBLICATIONS

International Search Report and Written Opinion of the International Searching Authority (Forms PCT/ISA/210 and PCT/ISA/237) for International Application No. PCT/JP2017/010235, dated Jun. 13, 2017, with English translation of the International Search Report.

\* cited by examiner

FIG. 9

|     | ISO SENSITIVITY |
| --- | --- |
| 1   | 100 |
| 2   | 125 |
| 3   | 160 |
| 4   | 200 |
| 5   | 250 |
| 6   | 320 |
| 7   | 400 |
| 8   | 500 |
| 9   | 640 |
| 10  | 800 |
| 11  | 1000 |
| 12  | 1250 |
| 13  | 1600 |
| 14  | 2000 |
| 15  | 2500 |
| 16  | 3200 |
| 17  | 4000 |
| 18  | 5000 |
| 19  | 6400 |
| 20  | 8000 |
| 21  | 10000 |
| 22  | 12800 |
| 23  | 16000 |
| 24  | 20000 |
| 26  | 25600 |
| 26  | 32000 |
| 27  | 40000 |
| 28  | 51200 |

FIG. 20

|  | STEP WIDTH | | |
|---|---|---|---|
|  | 1/3 STEP | 1/2 STEP | 1 STEP |
| 1 | 100 | 100 | 100 |
| 2 | 125 | 140 | 200 |
| 3 | 160 | 200 | 400 |
| 4 | 200 | 280 | 800 |
| 5 | 250 | 400 | 1600 |
| 6 | 320 | 560 | 3200 |
| 7 | 400 | 800 | 6400 |
| 8 | 500 | 1100 | 12800 |
| 9 | 640 | 1600 | 25600 |
| 10 | 800 | 2200 | 51200 |
| 11 | 1000 | 3200 | |
| 12 | 1250 | 4500 | |
| 13 | 1600 | 6400 | |
| 14 | 2000 | 9000 | |
| 15 | 2500 | 12800 | |
| 16 | 3200 | 18000 | |
| 17 | 4000 | 25600 | |
| 18 | 5000 | 36000 | |
| 19 | 6400 | 51200 | |
| 20 | 8000 | | |
| 21 | 10000 | | |
| 22 | 12800 | | |
| 23 | 16000 | | |
| 24 | 20000 | | |
| 26 | 25600 | | |
| 26 | 32000 | | |
| 27 | 40000 | | |
| 28 | 51200 | | |

SETTING DEVICE AND CAMERA

CROSS-REFERENCE TO RELATED APPLICATIONS

The present application is a Continuation of PCT International Application No. PCT/JP2017/010235 filed on Mar. 14, 2017 claiming priority under 35 U.S.C § 119(a) to Japanese Patent Application No. 2016-057801 filed on Mar. 23, 2016. Each of the above applications is hereby expressly incorporated by reference, in their entirety, into the present application.

BACKGROUND OF THE INVENTION

1. Field of the Invention

The present invention relates to a setting device and a camera, and more particularly, to a setting device that uses a rotary operation dial and a camera that includes the setting device in a camera body.

2. Description of the Related Art

Since a rotary operation dial can be intuitively operated and the set state of the rotary operation dial can also be confirmed at a glance, the rotary operation dial is employed in a lot of devices. From a long time ago, a rotary operation dial has been used particularly in a camera as means for setting various imaging conditions.

Settable items are displayed on a dial plate of the rotary operation dial. However, there is a limit to the number of items that can be displayed on the dial plate. The operation dial needs to be increased in size to increase the number of items to be displayed on the dial plate while ensuring a certain level of visibility.

JP2008-165118A and JP1997-133961A (JP-H09-133961) propose devices in which a liquid crystal display is disposed on a dial plate of an operation dial and a display on the liquid crystal display is switched according to the rotation of the operation dial.

SUMMARY OF THE INVENTION

However, JP2008-165118A and JP1997-133961A (JP-H09-133961A) have drawbacks in that whole settable conditions cannot be grasped at a glance and an intuitive operation as the advantage of the operation dial deteriorates.

The invention has been made in consideration of the above-mentioned circumstances, and an object of the invention is to provide a setting device and a camera that allow a user to easily grasp settable conditions with a compact structure.

Means for achieving the above-mentioned object are as follows.

(1) A setting device comprising:
an operation dial that includes a click mechanism and is endlessly rotatable in a normal rotation direction and a reverse rotation direction;
a display section that is provided on an upper surface of the operation dial;
a rotation detection unit that detects a rotation of the operation dial;
a set value switching unit that switches set values in order between a minimum value and a maximum value according to the rotation of the operation dial; and
a display control unit that controls a display on the display section according to the switching of the set values performed by the set value switching unit,
wherein the display control unit displays a currently selected set value at a set value-display position, displays the maximum value at a maximum value-display position that is set on a downstream side of the set value-display position in the normal rotation direction in a case in which the currently selected set value is a value other than the maximum value, and displays the minimum value at a minimum value-display position that is set on an upstream side of the set value-display position in the normal rotation direction in a case in which the currently selected set value is a value other than the minimum value.

According to this aspect, set values are switched in order in a case in which the operation dial is rotationally operated. The operation dial includes the display section on the upper surface thereof. A currently selected set value is displayed on the display section at the set value-display position. Accordingly, a user can confirm the current setting by looking at a display on the display section. Here, in a case in which the currently selected set value is not the maximum value that can be set by the operation dial, the maximum value that can be set is displayed at the maximum value-display position. Further, in a case in which the currently selected set value is not the minimum value that can be set by the operation dial, the minimum value that can be set is displayed at the minimum value-display position. Accordingly, it is possible to easily grasp a range that can be set by the operation dial. Furthermore, since only necessary information is displayed on the display section, a structure can be made to be compact.

(2) The setting device according to (1),
wherein the display control unit displays dots between the set value-display position and the maximum value-display position in the normal rotation direction, and displays dots between the set value-display position and the minimum value-display position in the reverse rotation direction.

According to this aspect, dots are displayed between the set value-display position and the maximum value-display position. Further, dots are displayed between the set value-display position and the minimum value-display position. Accordingly, a user can intuitively grasp that the user have a choice.

(3) The setting device according to (2),
wherein the display control unit changes the number of the dots, which are displayed between the set value-display position and the maximum value-display position, according to the number of set values that are selectable between the currently selected set value and the maximum value, and changes the number of the dots, which are displayed between the set value-display position and the minimum value-display position, according to the number of set values that are selectable between the currently selected set value and the minimum value.

According to this aspect, the number of the dots is increased or decreased according to the number of set values thinned out. Accordingly, a width for selection can be intuitively grasped.

(4) The setting device according to any one of (1) to (3),
wherein the display control unit displays a certain number of set values, which are positioned ahead and are selectable in a case in which the operation dial is rotated in the reverse rotation direction, at previous set value-display positions that are set on the downstream side of the set value-display position in the normal rotation direction, and displays a certain number of set values, which are positioned ahead and are selectable in a case in which the operation dial is rotated in the normal rotation direction, at next set value-display positions that are set on the upstream side of the set value-display position in the normal rotation direction.

According to this aspect, a certain number of set values, which are positioned ahead, are displayed on the display section. Accordingly, in a case in which the operation dial is rotationally operated, set values to be set next can be easily grasped.

(5) The setting device according to (4),
wherein the display control unit displays two set values, which are positioned ahead and are selectable in a case in which the operation dial is rotated in the reverse rotation direction, at the previous set value-display positions, and displays two set values, which are positioned ahead and are selectable in a case in which the operation dial is rotated in the normal rotation direction, at the next set value-display positions.

According to this aspect, two set values, which are positioned ahead, are displayed on the display section. Accordingly, necessary information can be effectively displayed in a small display space.

(6) The setting device according to any one of (1) to (5), further comprising:
a step width changing unit that changes a step width of switching of the set values.

According to this aspect, a step width of switching of the set values can be randomly changed. Accordingly, since setting can be made according to user's taste, usability can be further improved. The step width of switching of the set values means the amount that is to be changed by one time of switching. That is, the step width of switching of the set values is to determine the amount to be changed by one time of switching. The amount to be changed by one time of switching is increased with an increase in a step width. On the other hand, the number of set values, which can be switched, is reduced with an increase in a step width.

(7) The setting device according to (6),
wherein the step width changing unit changes the step width of switching of the set values according to a rotational speed of the operation dial.

According to this aspect, the step width of switching of the set values is changed according to the rotational speed of the operation dial. For example, the step width of switching of the set values is increased with an increase in the rotational speed of the operation dial. Accordingly, a sensitivity can be quickly set to desired setting. Further, the step width of switching of the set values is reduced with a reduction in the rotational speed of the operation dial. Accordingly, a sensitivity can be finely set.

(8) The setting device according to any one of (1) to (7),
wherein the display control unit displays the set value displayed at the set value-display position so that the set value displayed at the set value-display position is larger than set values displayed in other regions.

According to this aspect, the currently selected set value is displayed to be larger than other displays. Accordingly, the current setting can be easily grasped.

(9) A camera comprising:
the setting device according to any one of (1) to (8).

The number of conditions, which can be set by a camera, is increased with the advancement of an imaging function. On the other hand, since a camera is reduced in size, a space where an operation member can be installed is reduced in size. Since the setting devices according to (1) to (8) can make a plurality of settings with a compact structure, the setting device particularly effectively acts in a case in which the setting device is built in a high-functioning camera.

According to the invention, it is possible to easily grasp settable conditions with a compact structure.

BRIEF DESCRIPTION OF THE DRAWINGS

FIG. 9 is a table of ISO sensitivities that can be set by the digital camera.

Figure 11:
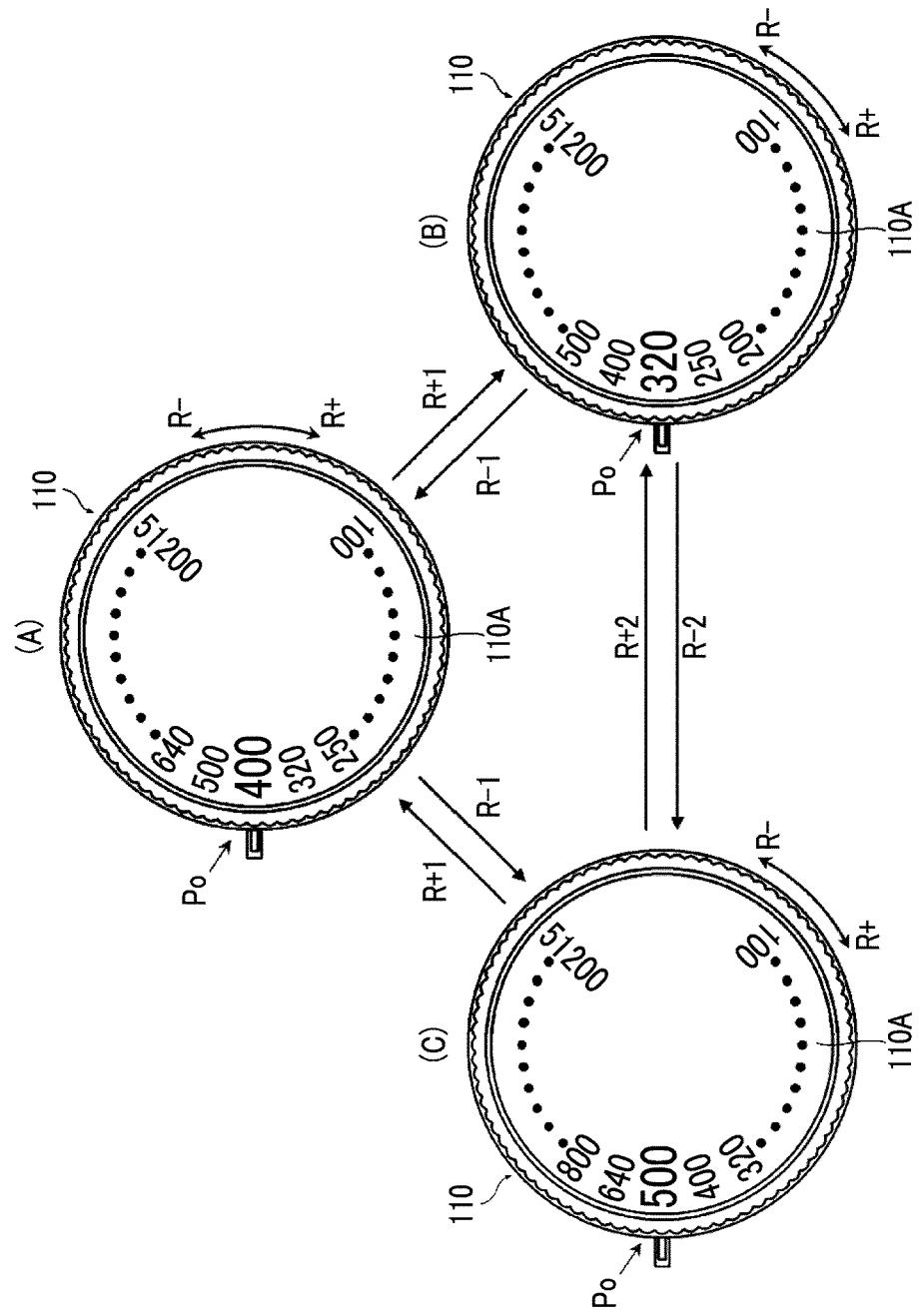

(A), (B), and (C) of FIG. 11 are diagrams showing an example of the transition state of a display on a display section that is in conjunction with the operation of the sensitivity dial.

Figure 12:
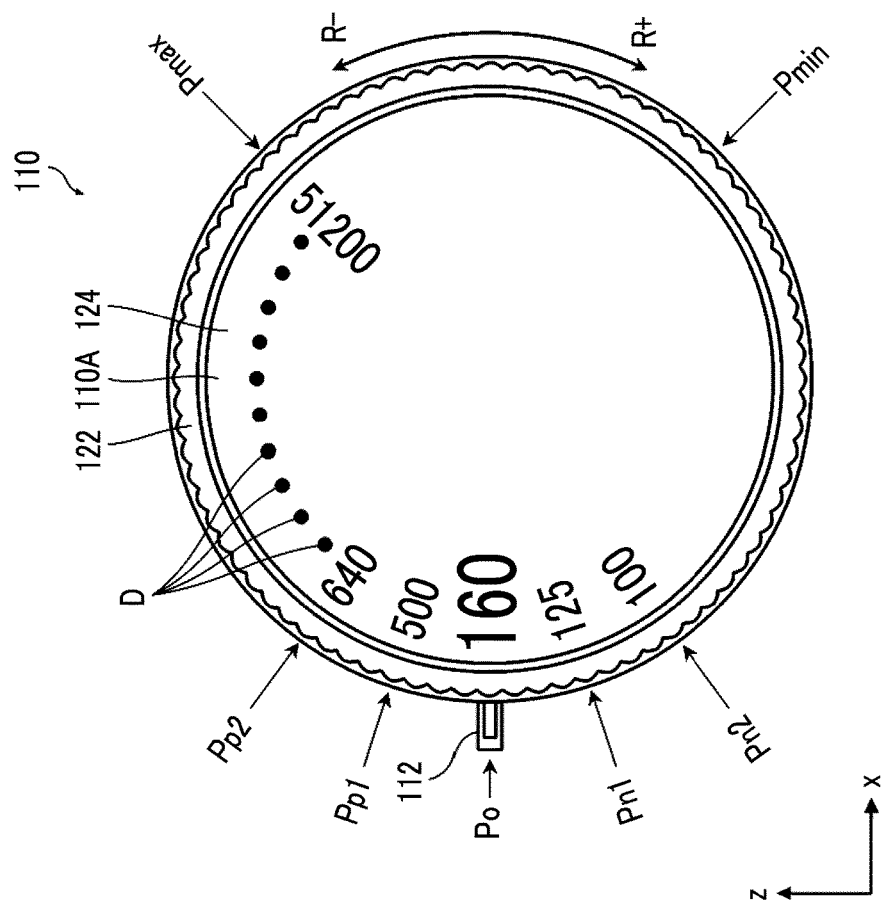

FIG. 12 is a diagram showing an example of a display on the display section in a case in which a currently set sensitivity is ISO160.

Figure 13:
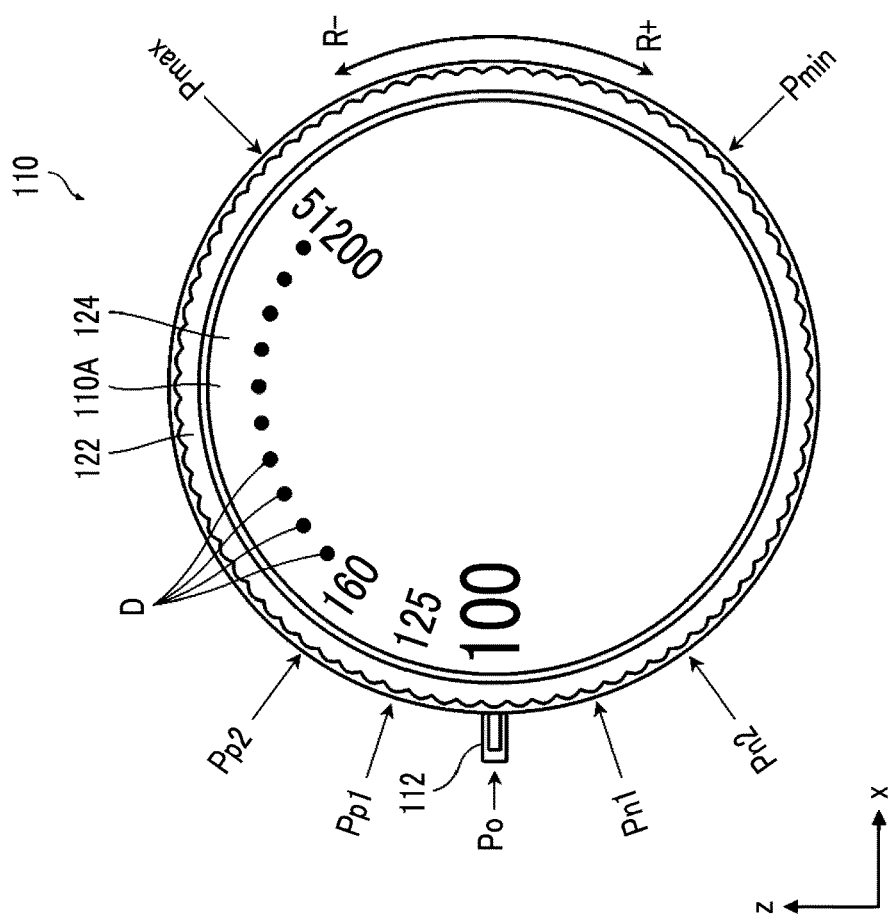

FIG. 13 is a diagram showing an example of a display on the display section in a case in which a currently set sensitivity has the minimum value of a settable sensitivity.

Figure 14:
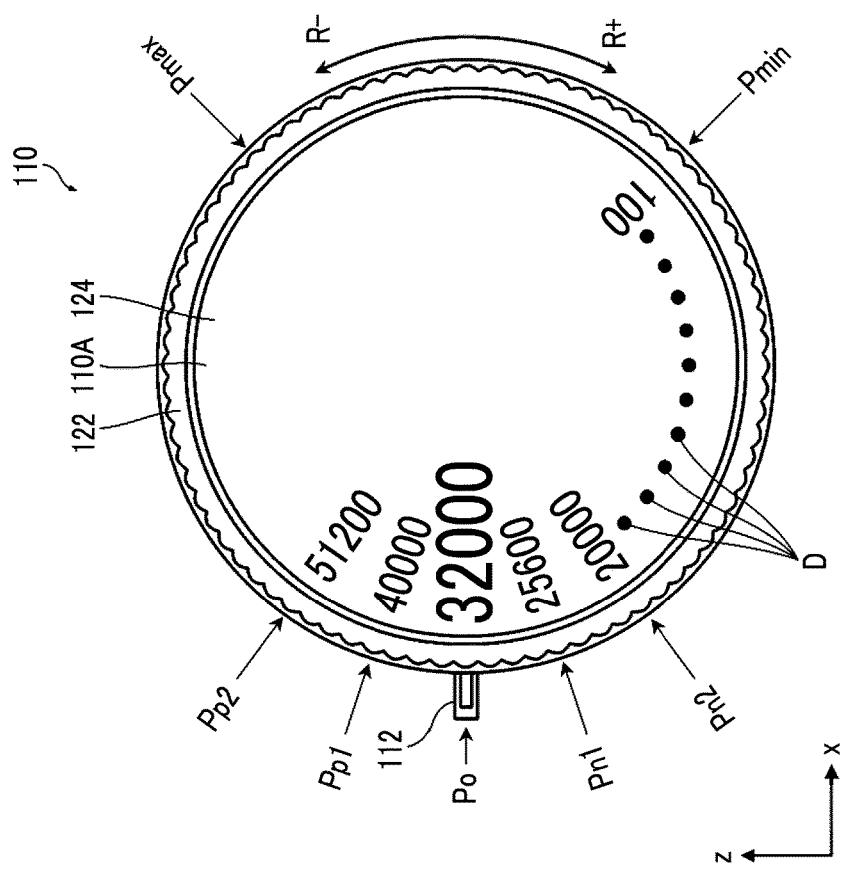

FIG. 14 is a diagram showing an example of a display on the display section in a case in which a currently set sensitivity is ISO32000.

Figure 15:
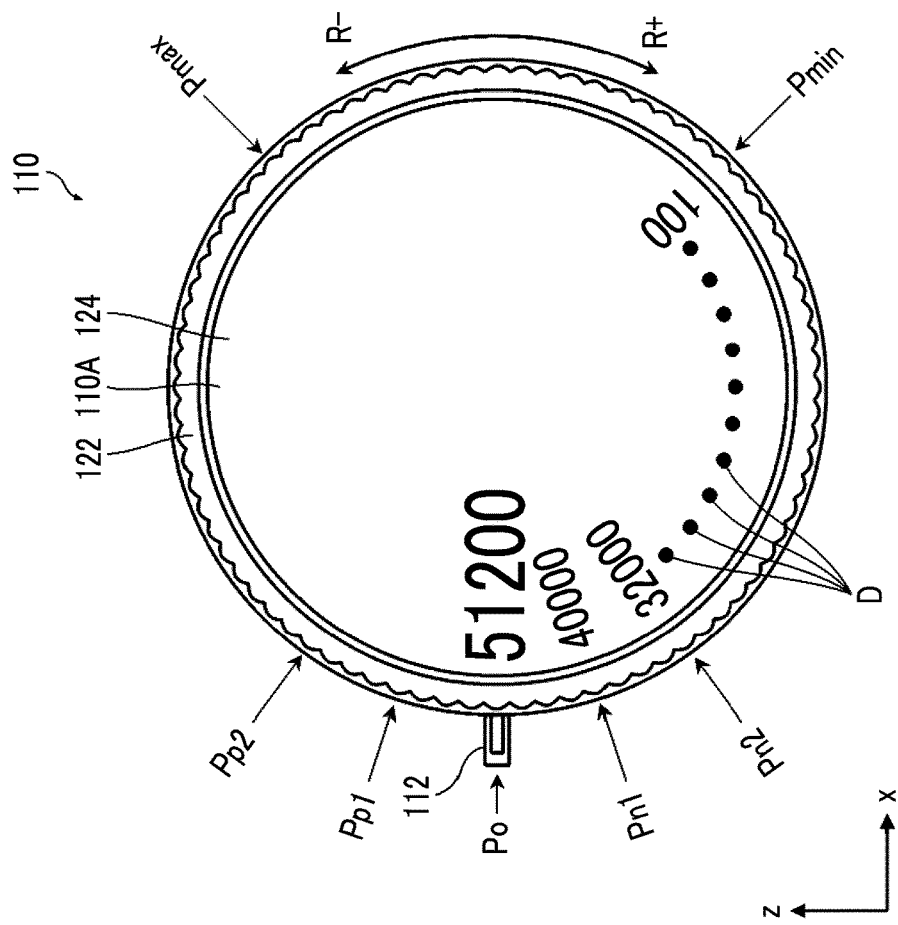

FIG. 15 is a diagram showing an example of a display on the display section in a case in which a currently set sensitivity has the maximum value of a settable sensitivity.

Figure 16:
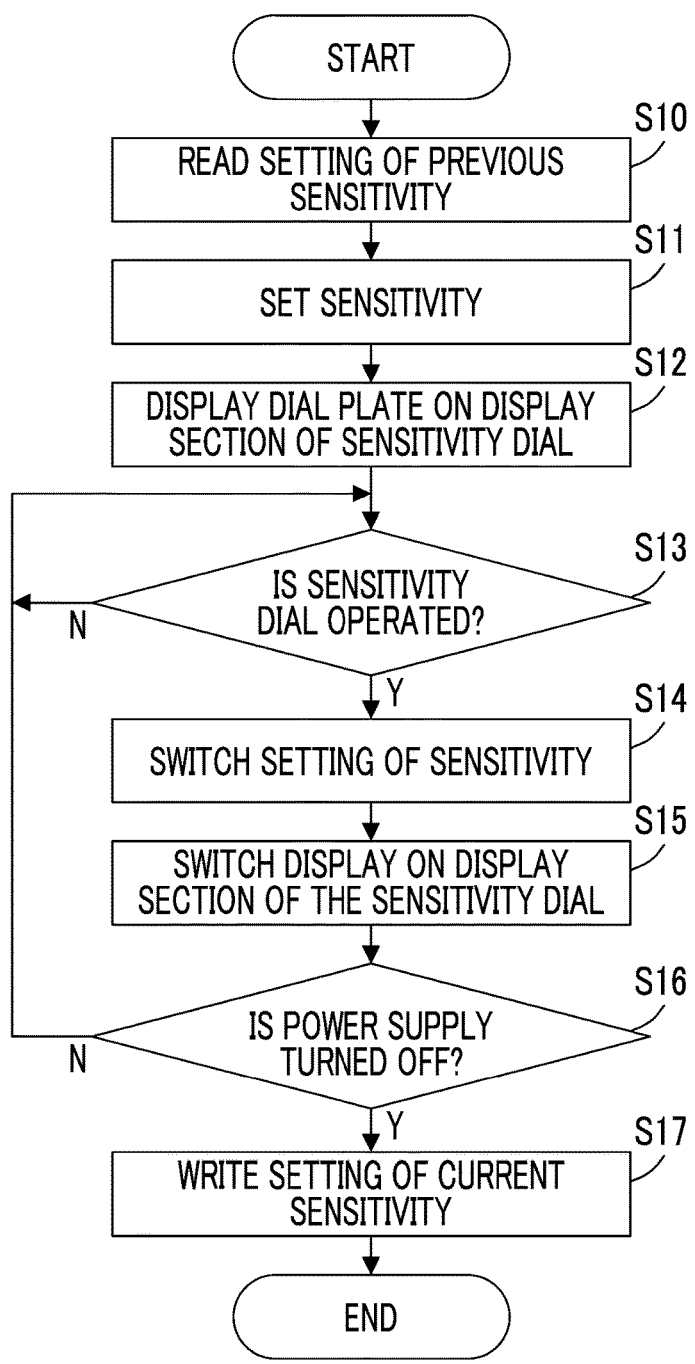

FIG. 16 is a flowchart showing the procedure of processing for setting a sensitivity by the sensitivity setting device.

Figure 17:
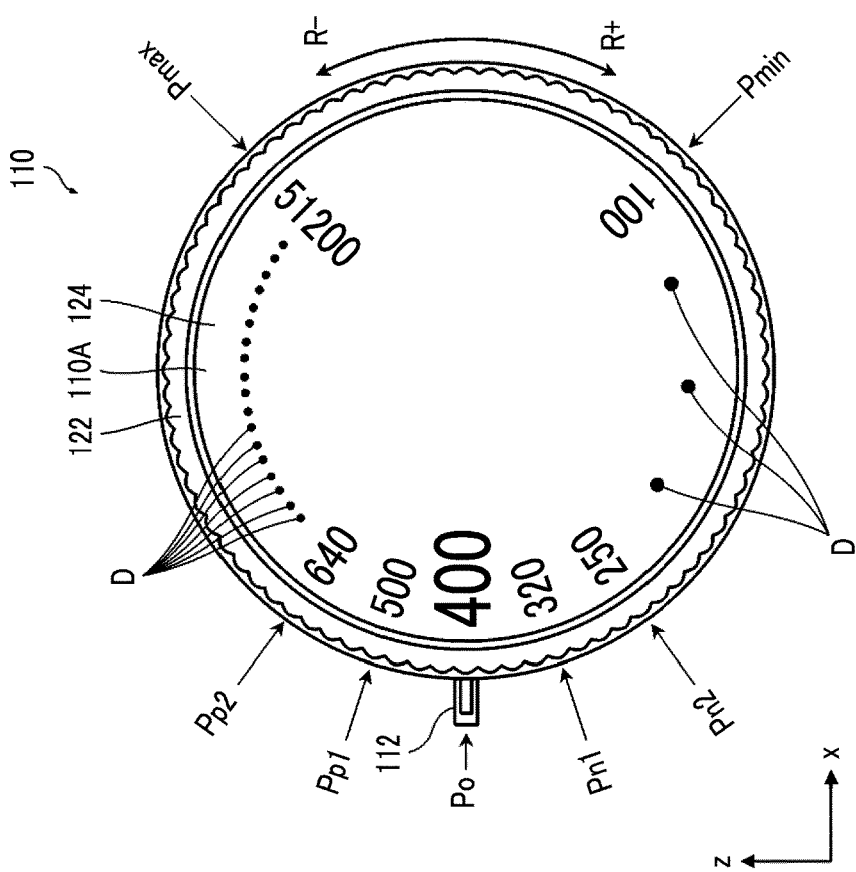

FIG. 17 is a diagram showing another example of the display aspect of the display section of the sensitivity dial.

Figure 18:
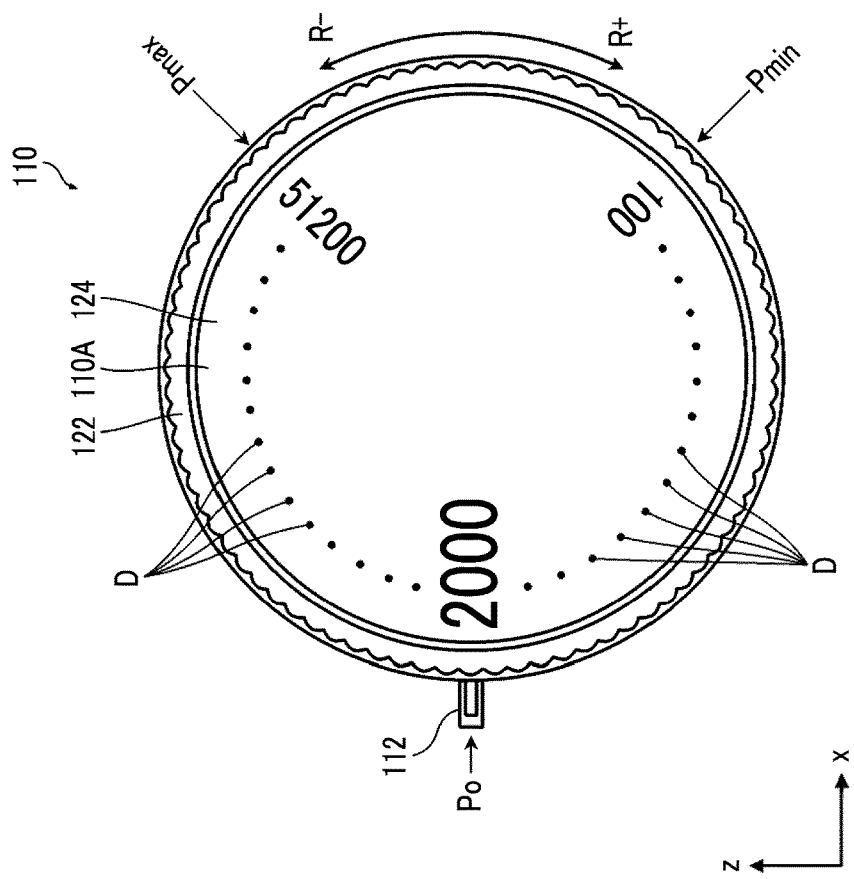

FIG. 18 is a diagram showing another example of the display aspect of the display section of the sensitivity dial.

Figure 19:
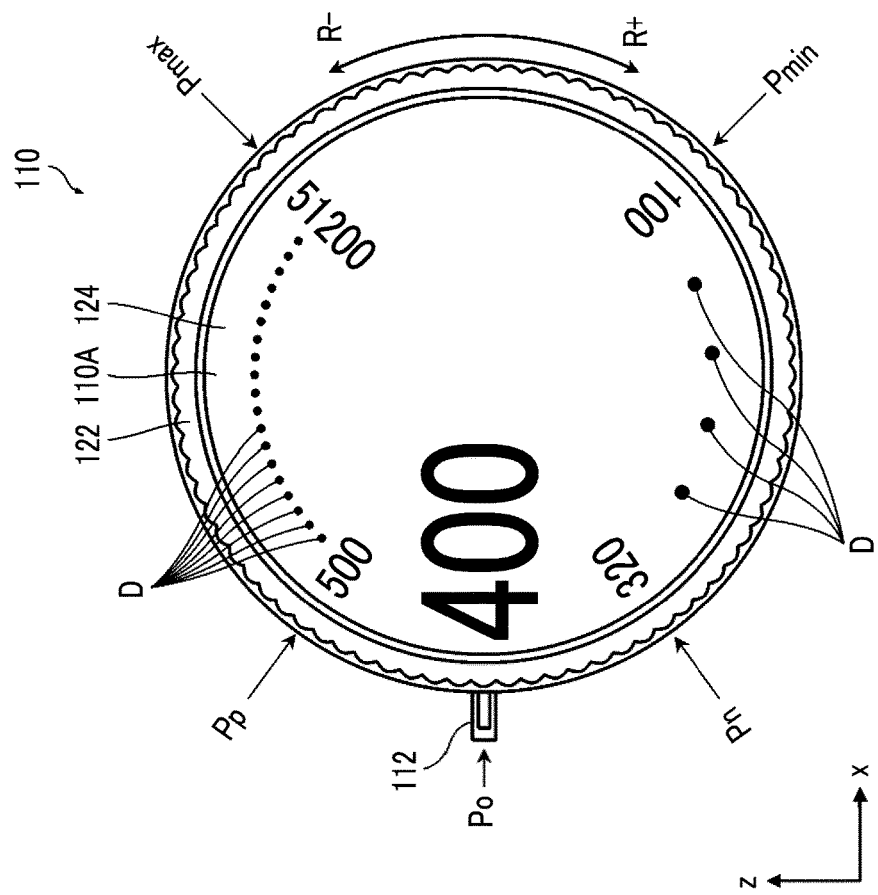

FIG. 19 is a diagram showing another example of the display aspect of the display section of the sensitivity dial.

FIG. 20 is a table of settable sensitivities in a case in which an ISO sensitivity is changed with step widths of ⅓ step, ½ step, and one step.

Figure 21:
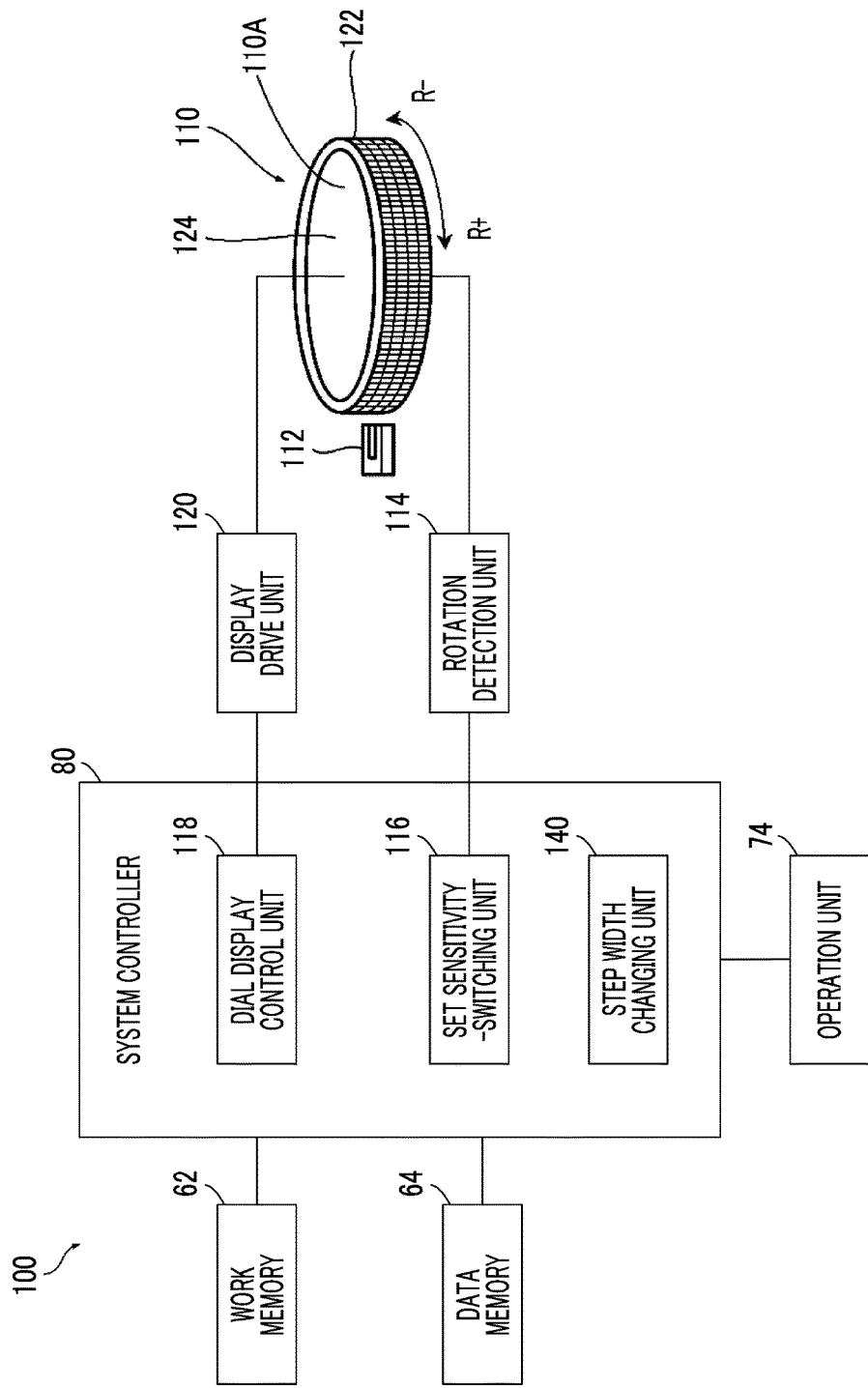

FIG. 21 is a block diagram showing the schematic configuration of a sensitivity setting device that has a function to change a step width.

Figure 22:
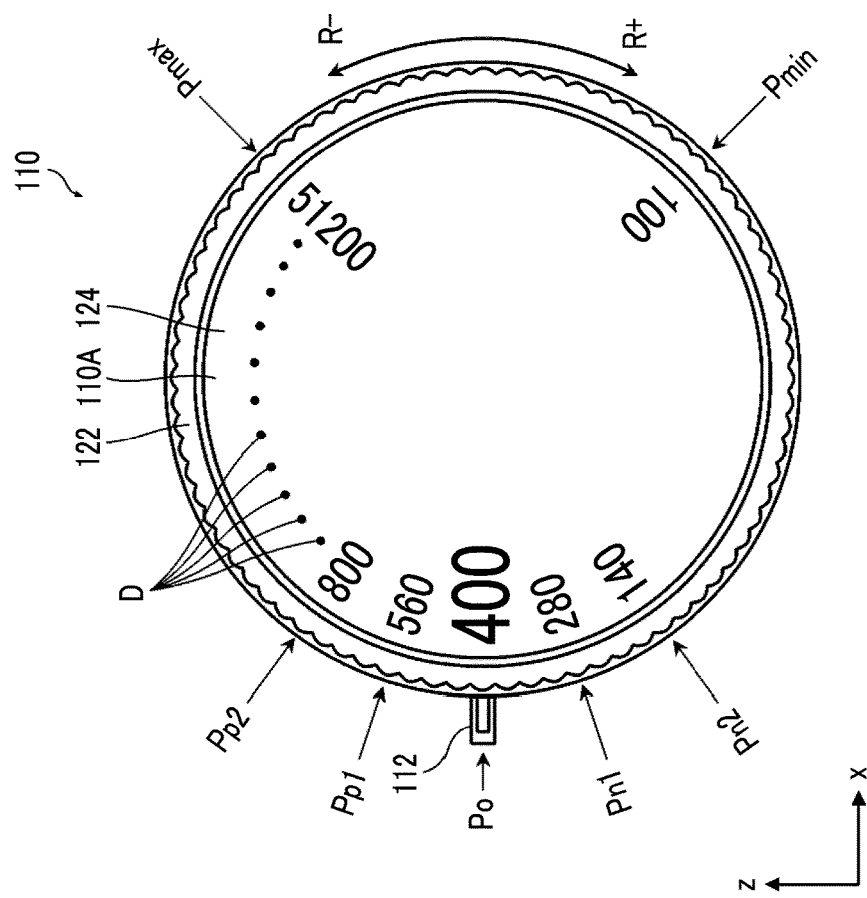

FIG. 22 is a diagram showing an example of a display on the display section of the sensitivity dial in a case in which a step width of the setting of sensitivities is set to ½ step.

Figure 23:
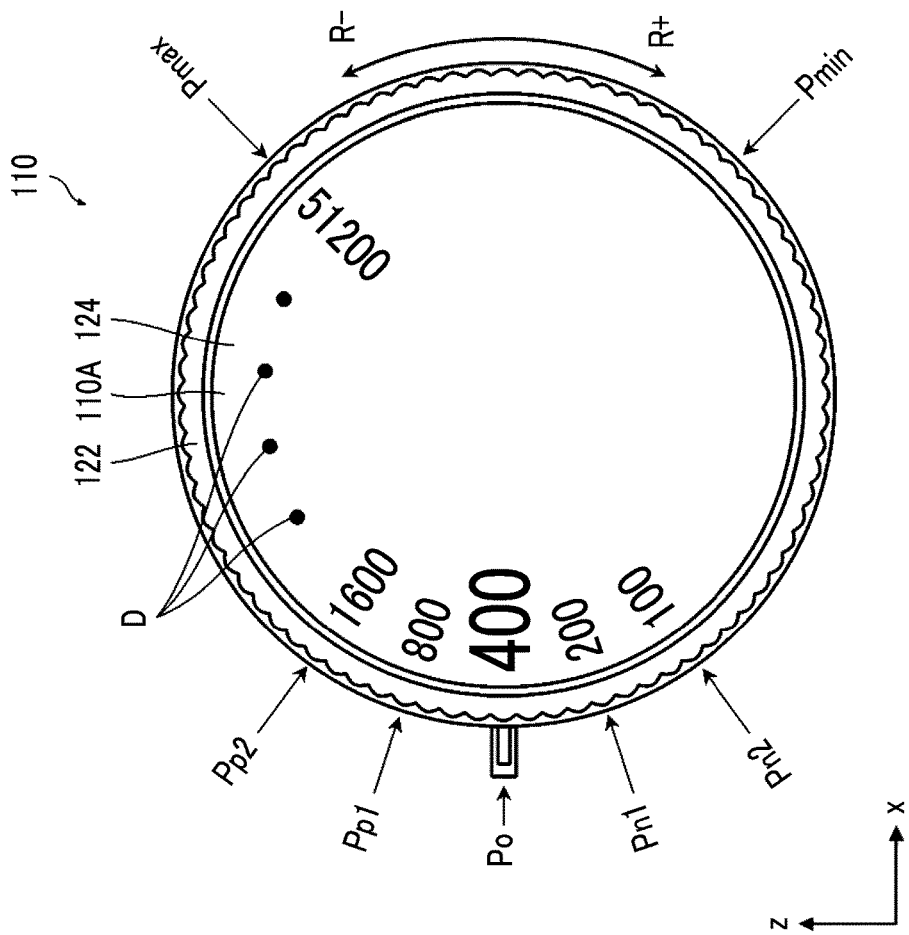

FIG. 23 is a diagram showing an example of a display on the display section of the sensitivity dial in a case in which a step width of the setting of sensitivities is set to one step.

Figure 24:
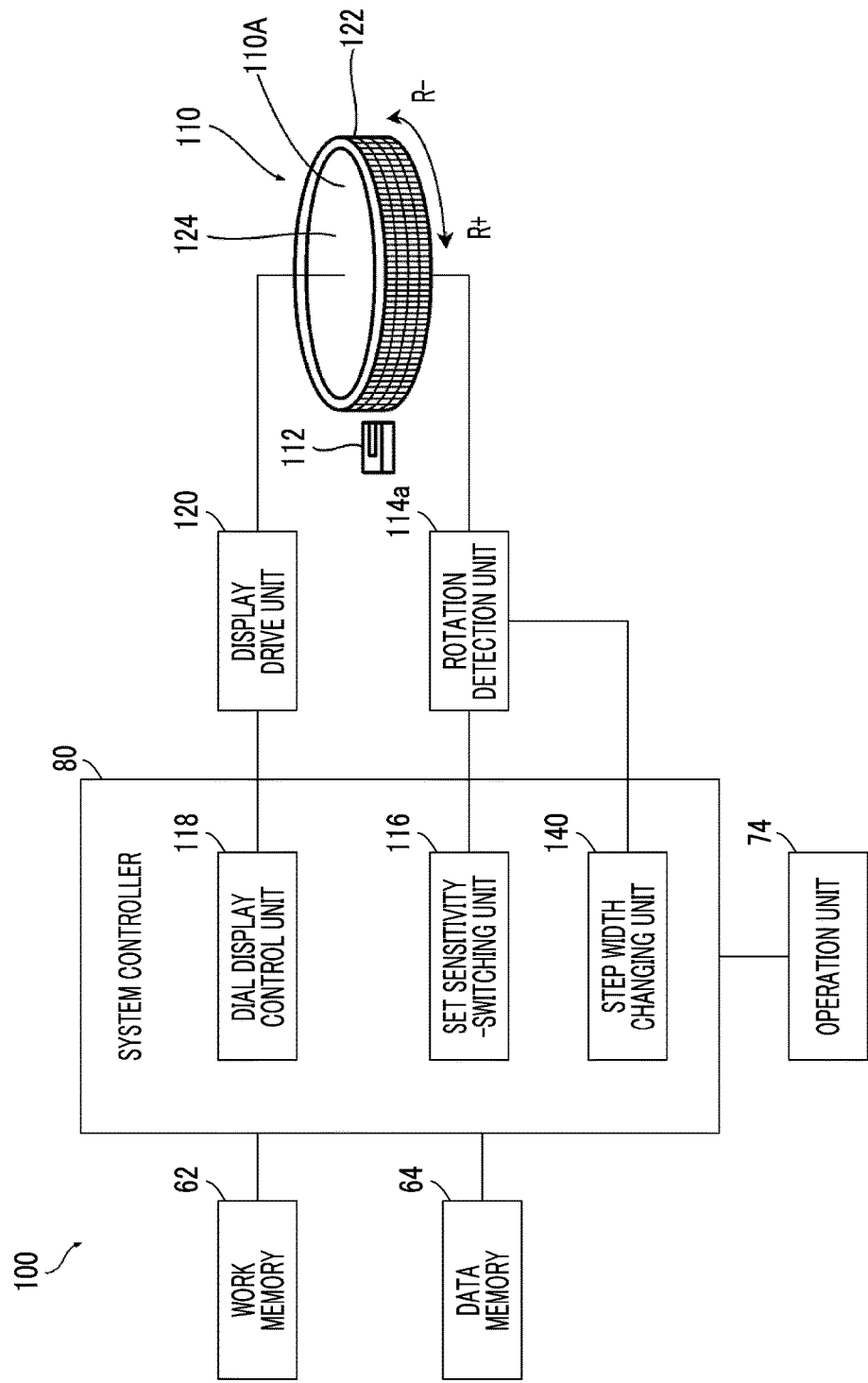

FIG. 24 is a block diagram showing the schematic configuration of a sensitivity setting device that has a function to change a step width according to the rotational speed of the sensitivity dial.

Figure 25:
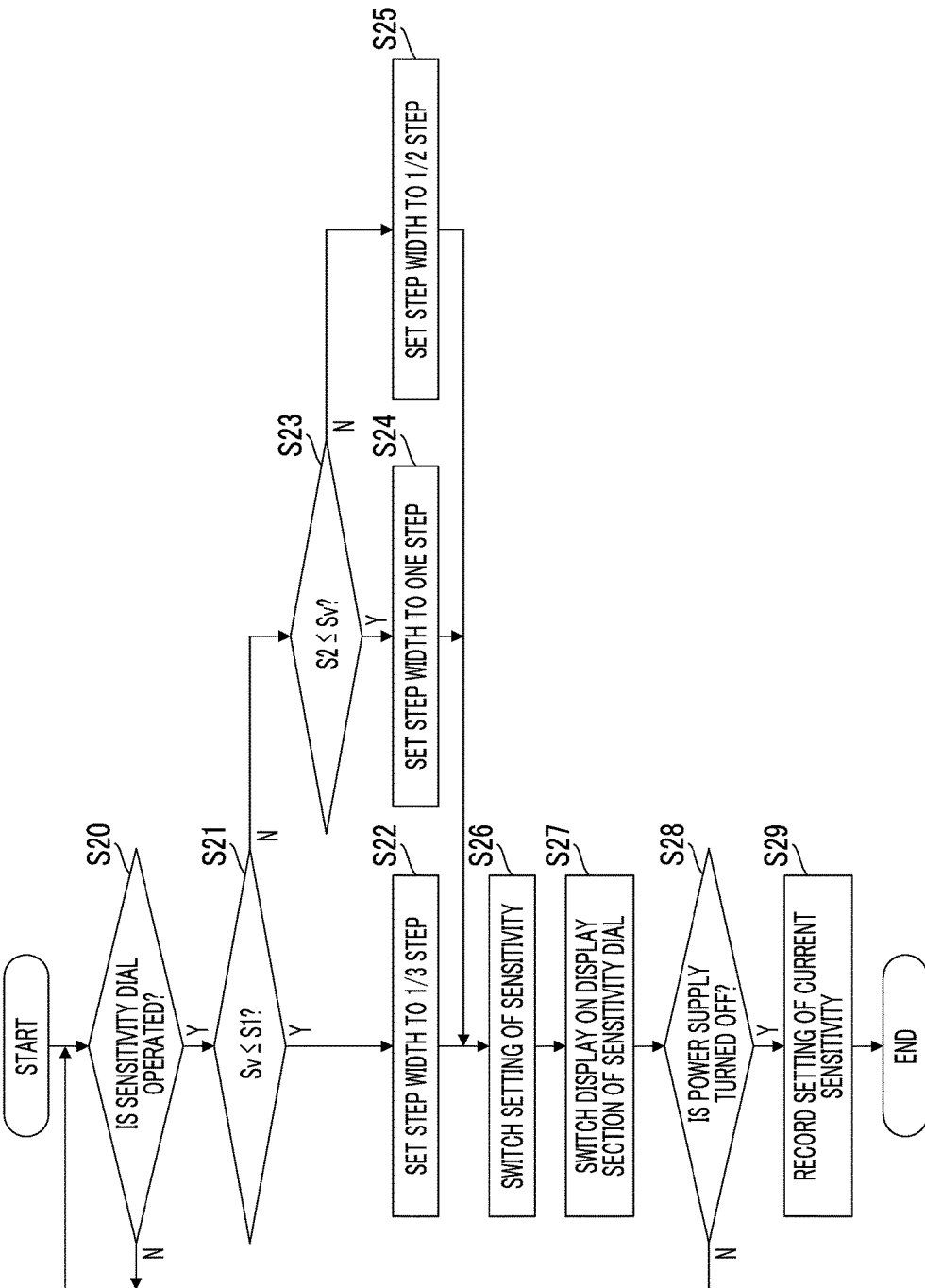

FIG. 25 is a flowchart showing the procedure of processing in a case in which a step width is automatically switched according to the rotational speed of the sensitivity dial.

Figure 26:
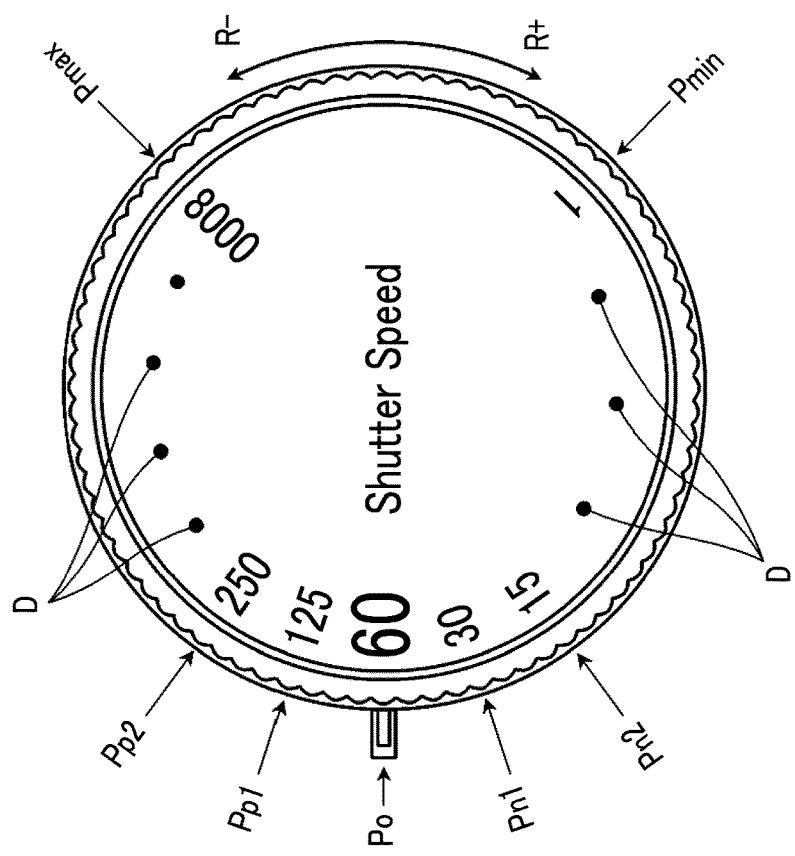

FIG. 26 is a diagram showing an example of a display on the display section in a case in which an operation dial is used as a shutter speed dial.

Figure 27:
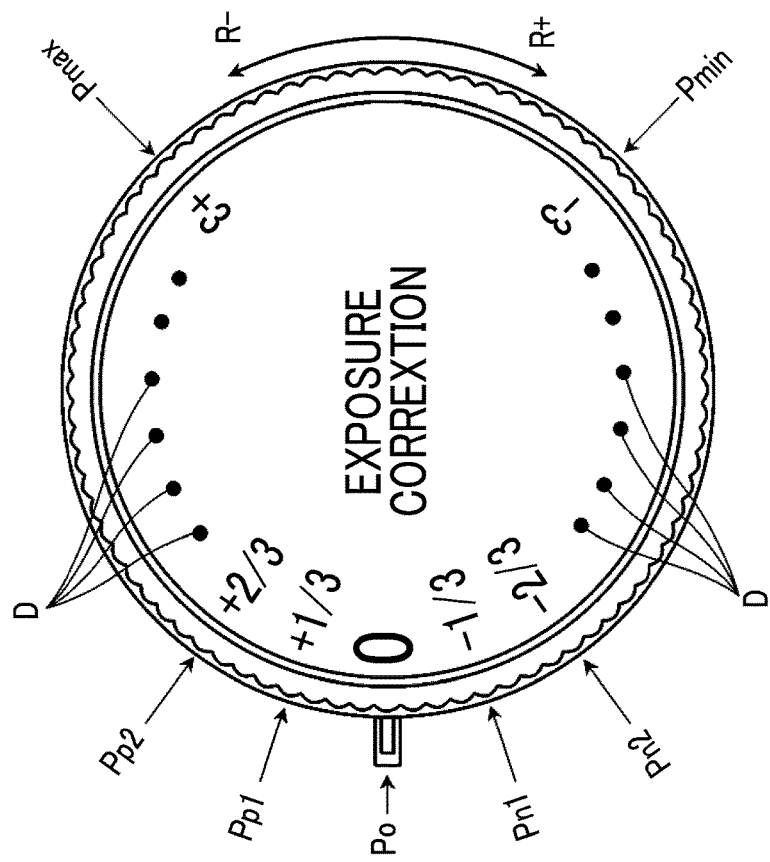

FIG. 27 is a diagram showing an example of a display on the display section in a case in which the operation dial is used as an exposure correction dial.

Figure 28:
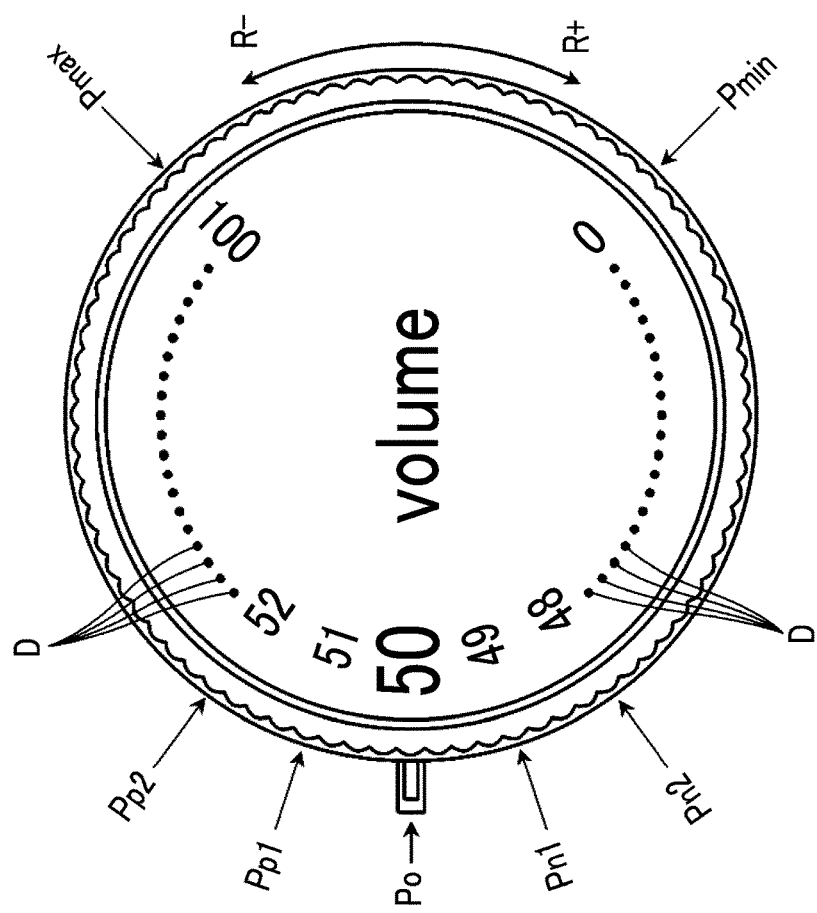

FIG. 28 is a diagram showing an example of a display on the display section in a case in which the operation dial is used as a volume adjustment dial, that is, a volume dial.

DESCRIPTION OF THE PREFERRED EMBODIMENTS

A preferred embodiment of the invention will be described in detail below with reference to accompanying drawings.

<<Appearance>>

FIGS. 1, 2, 3, and 4 are a front view, a back view, a plan view, and a left side view showing the appearance of a digital camera, respectively.

In this specification, a direction (a z direction in FIG. 3) parallel to an optical axis L is referred to as a front-rear direction and a subject side is referred to as a front side. Further, on a plane orthogonal to the optical axis L, a direction parallel to a long side of an image sensor 50 (an x direction in FIG. 1) is referred to as a lateral direction or a left-right direction and a direction parallel to a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding light, which is incident from a lens, to an optical viewfinder, and is also referred to as a mirrorless digital camera.

Figure 5:
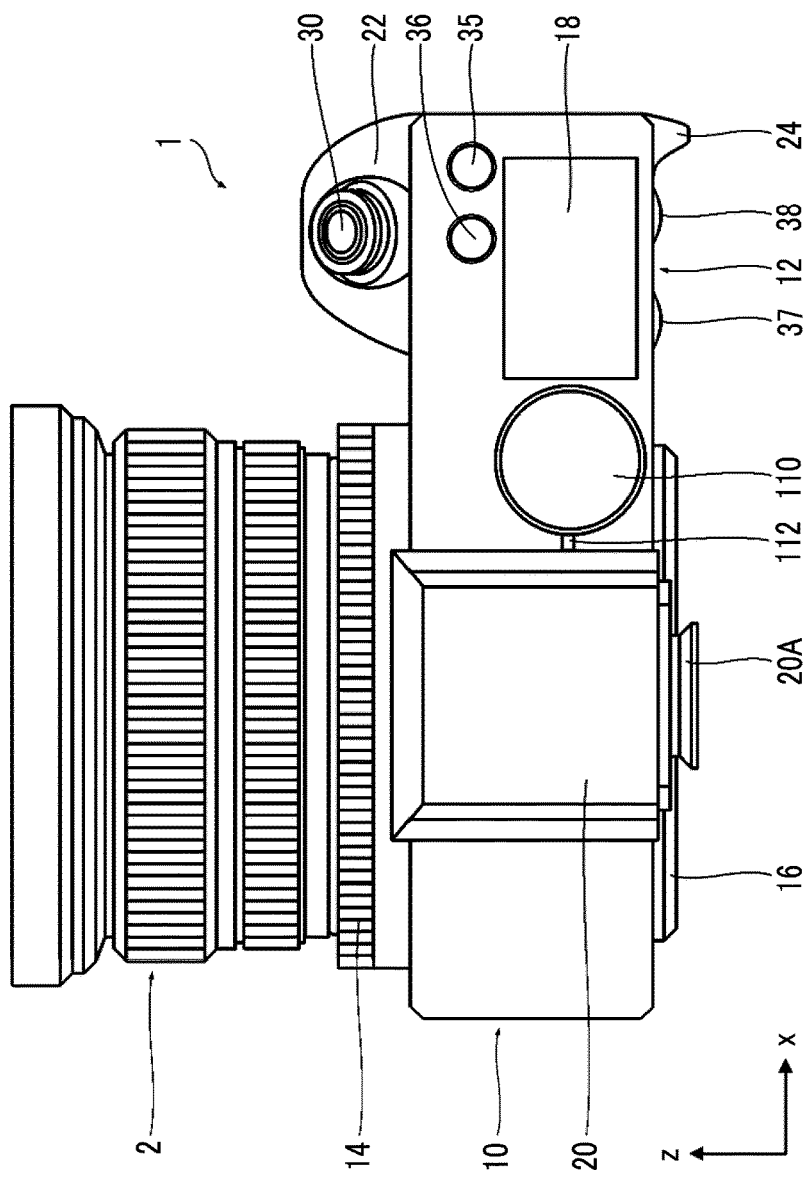
FIG. 5 is a plan view of the digital camera on which a lens is mounted.

FIG. 5 is a plan view of the digital camera on which a lens is mounted. As shown in FIG. 5, the digital camera 1 of this embodiment is used in a state in which a lens 2 is mounted on a camera body 10. The camera body 10 is provided with a lens mount 14, a main display 16, a sub-display 18, an electronic view finder 20, various operation buttons, and the like.

<Camera Body>

The camera body 10 has the shape of a rectangular box that is thin in the front-rear direction. One (left in FIG. 1) end portion of the camera body 10 is formed as a grip portion 12. A grip 22 is provided on the front side of the grip portion 12, and a thumb rest 24 is provided on the back side of the grip portion 12.

<Lens Mount>

Figure 1:
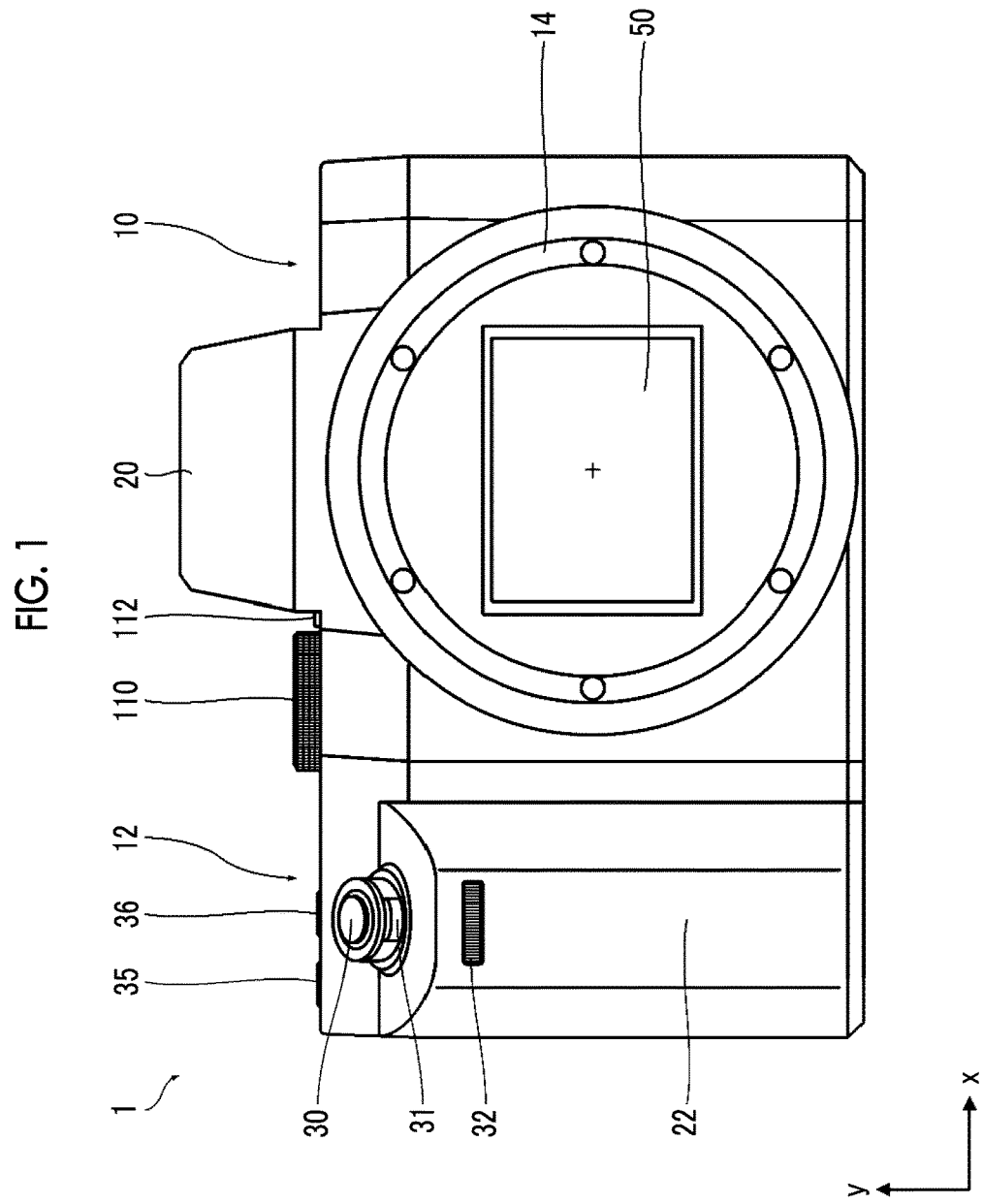
FIG. 1 is a front view showing the appearance of a digital camera.

The lens mount 14 is a mounting portion for the lens 2. As shown in FIG. 1, the lens mount 14 is provided on the front of the camera body 10.

<Main Display>

Figure 2:
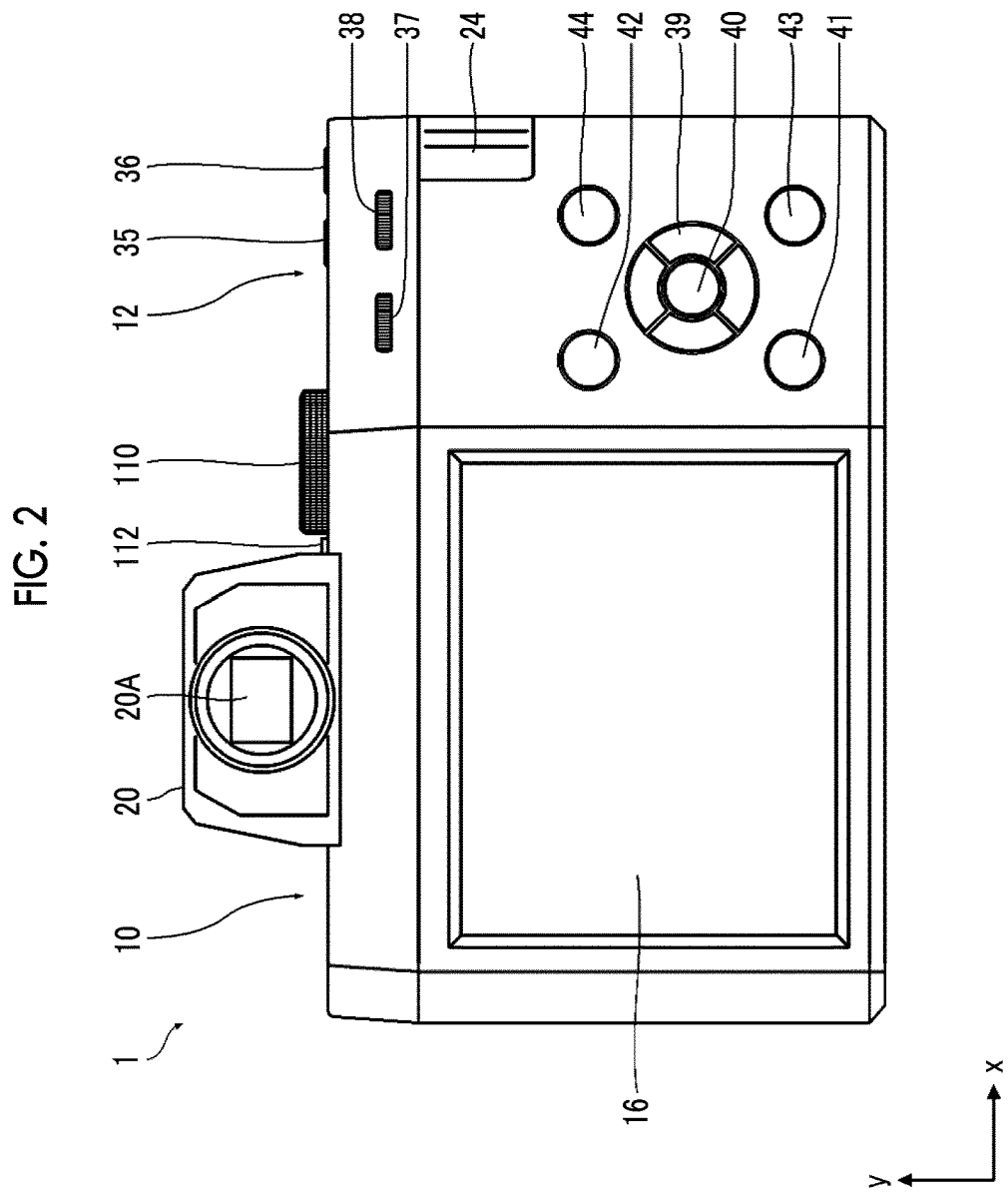
FIG. 2 is a back view showing the appearance of the digital camera.

The main display 16 is formed of a large-screen display. As shown in FIG. 2, the main display 16 is provided on the back of the camera body 10. The main display 16 is formed of, for example, a color liquid crystal display (LCD). The main display 16 is used to display an image, and is also used as a setting screen in a case in which various settings are performed.

<Sub-Display>

Figure 3:
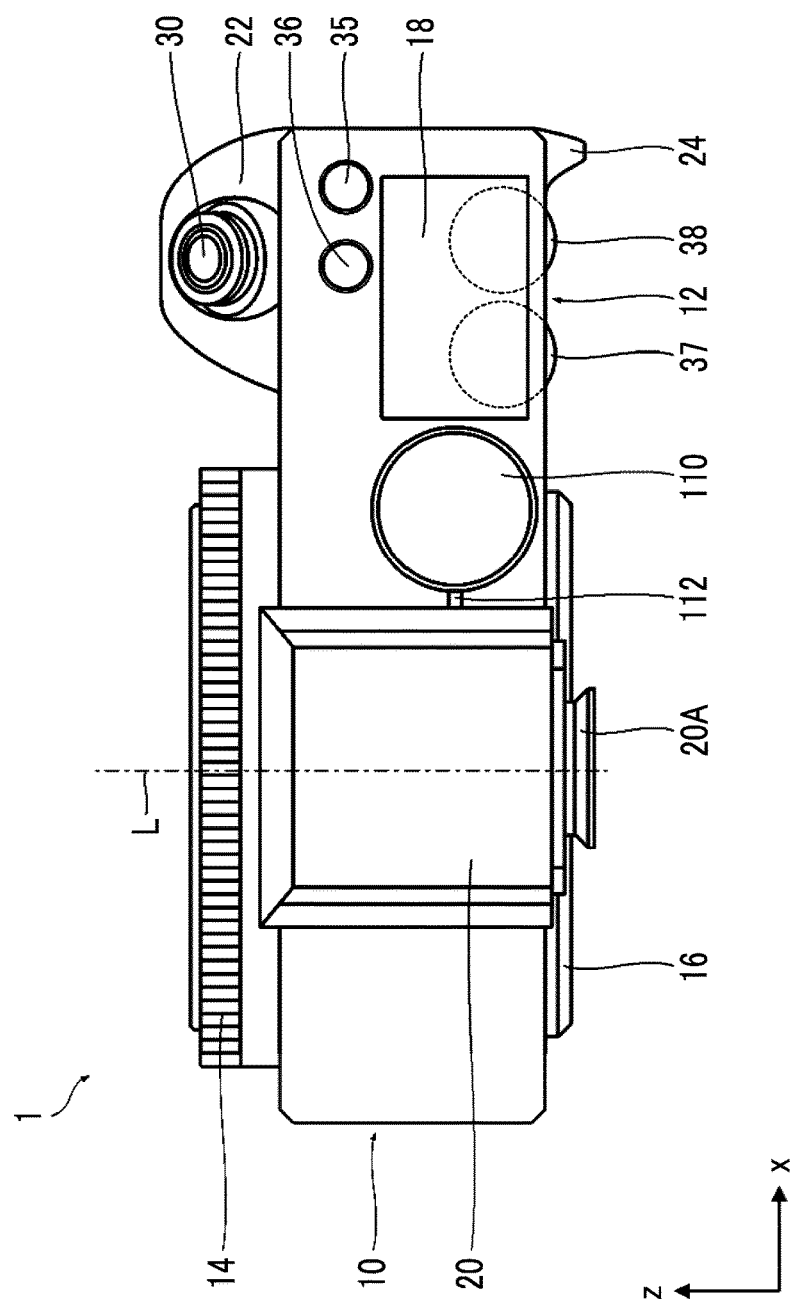
FIG. 3 is a plan view showing the appearance of the digital camera.
Figure 4:
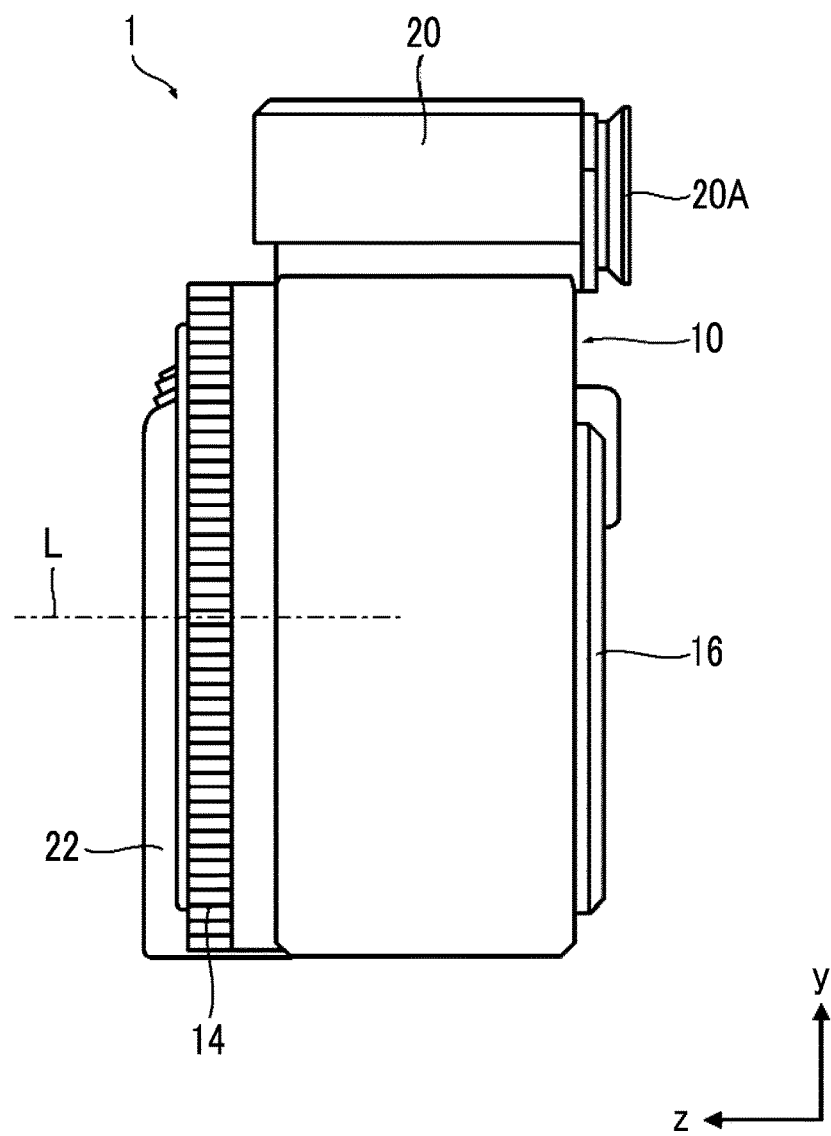
FIG. 4 is a left side view showing the appearance of the digital camera.

The sub-display 18 is formed of a small-screen display. As shown in FIG. 3, the sub-display 18 is provided on the upper surface of the camera body 10. The sub-display 18 is formed of, for example, a reflective liquid crystal display (reflective LCD) provided with an illumination lamp. The contents of settings of the camera, and the like are displayed on the sub-display 18. A shutter speed, a stop value (F-Number), an ISO (International Organization for Standardization) sensitivity, which are currently set, and the like are included in the contents of settings of the camera.

<Electronic View Finder>

The electronic view finder 20 is provided on the upper surface portion of the camera body 10. As shown in FIG. 2, the electronic view finder 20 includes an eyepiece portion 20A on the back side of the camera body 10. A so-called live view image is displayed on the electronic view finder 20. The live view image is an image that is captured in real time by the image sensor.

<Operation Buttons>

The camera body 10 is provided with a shutter button 30, a power supply lever 31, a front command dial 32, a sensitivity dial 110, an illumination button 35, a function button 36, a first rear command dial 37, a second rear command dial 38, selector buttons 39, a menu button 40, a cancel button 41, a play button 42, a delete button 43, an imaging condition-setting button 44, and the like as the operation buttons.

The shutter button 30 is provided at the top portion of the grip 22. The shutter button 30 is formed of a so-called two-stage switch that has a half-pressed stage and a fully-pressed stage. In a case in which the shutter button 30 is half pressed, the metering of light, the measurement of a distance, or the like is performed. In a case in which the shutter button 30 is fully pressed, main imaging is performed.

The power supply lever 31 is disposed coaxially with the shutter button 30. The power supply lever 31 is formed of a rotary lever. In a case in which the power supply lever 31 is rotated to an ON position, a power supply of the digital camera 1 is turned on. In a case in which the power supply lever 31 is rotated to an OFF position, the power supply of the digital camera 1 is turned off.

The front command dial 32 is provided in the grip 22. The front command dial 32 is formed of a rotary dial. The front command dial 32 is disposed so that a portion of the front command dial 32 is exposed to the outer surface of the grip 22. The exposed portion of the front command dial 32 is used to rotationally operate the front command dial 32. A plurality of functions are assigned to the front command dial 32. The functions to be assigned to the front command dial 32 are switched according to the state of the digital camera 1.

The sensitivity dial 110 is provided on the upper surface of the camera body 10. The sensitivity dial 110 is a dial that is used to set the sensitivity of imaging. A user rotationally operates the sensitivity dial to set a desired sensitivity. A sensitivity setting device including the sensitivity dial 110 will be described in detail later.

The illumination button 35 is provided on the upper surface of the camera body 10. The illumination button 35 is a button that is used to switch on and off the illumination lamp of the sub-display 18. Whenever the illumination button 35 is pressed once, the illumination lamp of the sub-display 18 is switched to be turned on and off.

The function button 36 is provided on the upper surface of the camera body 10. A plurality of functions are assigned to the function button 36. The functions to be assigned to the function button 36 are switched according to the state of the digital camera 1.

The first rear command dial 37 and the second rear command dial 38 are arranged in parallel on the back of the camera body 10. Each of the first rear command dial 37 and the second rear command dial 38 is formed of a rotary dial. The first rear command dial 37 and the second rear command dial 38 are disposed so that a portion of each of the first rear command dial 37 and the second rear command dial 38 is exposed to the back of the camera body 10. The exposed portions of the first rear command dial 37 and the second rear command dial 38 are used to rotationally operate the first rear command dial 37 and the second rear command dial 38. A plurality of functions are assigned to each of the first rear command dial 37 and the second rear command dial 38. The functions to be assigned to the first rear command dial 37 and the second rear command dial 38 are switched according to the state of the digital camera 1.

The selector buttons 39 are provided on the back of the camera body 10. The selector buttons 39 are formed of four buttons that are arranged on the same circle. A plurality of functions are assigned to each button. The functions to be assigned to each button are switched according to the state of the digital camera 1.

The menu button 40 is provided on the back of the camera body 10. The menu button 40 is a button that is used to call a menu screen. In a case in which the menu button 40 is pressed, a menu screen used to perform various settings is displayed on the main display 16. Further, the menu button 40 also functions as a decision button (OK button), and is used for the decision of an item to be selected, and the like.

The cancel button 41 is provided on the back of the camera body 10. The cancel button 41 is a button that is used to instruct the camera to cancel an operation. In a case in which the cancel button 41 is pressed, an instruction to cancel an item to be selected, or the like is input.

The play button 42 is provided on the back of the camera body 10. The play button 42 is a button that is used to switch a mode to a playback mode. In a case in which the play button 42 is pressed, the mode of the digital camera 1 is switched to a playback mode. In a case in which the playback mode is set, a taken image is read from a memory card and is played and displayed on the main display 16.

The delete button 43 is provided on the back of the camera body 10. The delete button 43 is a button that is used to instruct the camera to delete the taken image. In a case in which the delete button 43 is pressed during the playback of the image, the image, which is being played, is deleted from the memory card.

The imaging condition-setting button 44 is provided on the back of the camera body 10. The imaging condition-setting button 44 is a button that is used to call a setting screen for imaging conditions. In a case in which the imaging condition-setting button 44 is pressed, the setting screen for imaging conditions is displayed on the main display 16.

<<Control System>>

Figure 6:
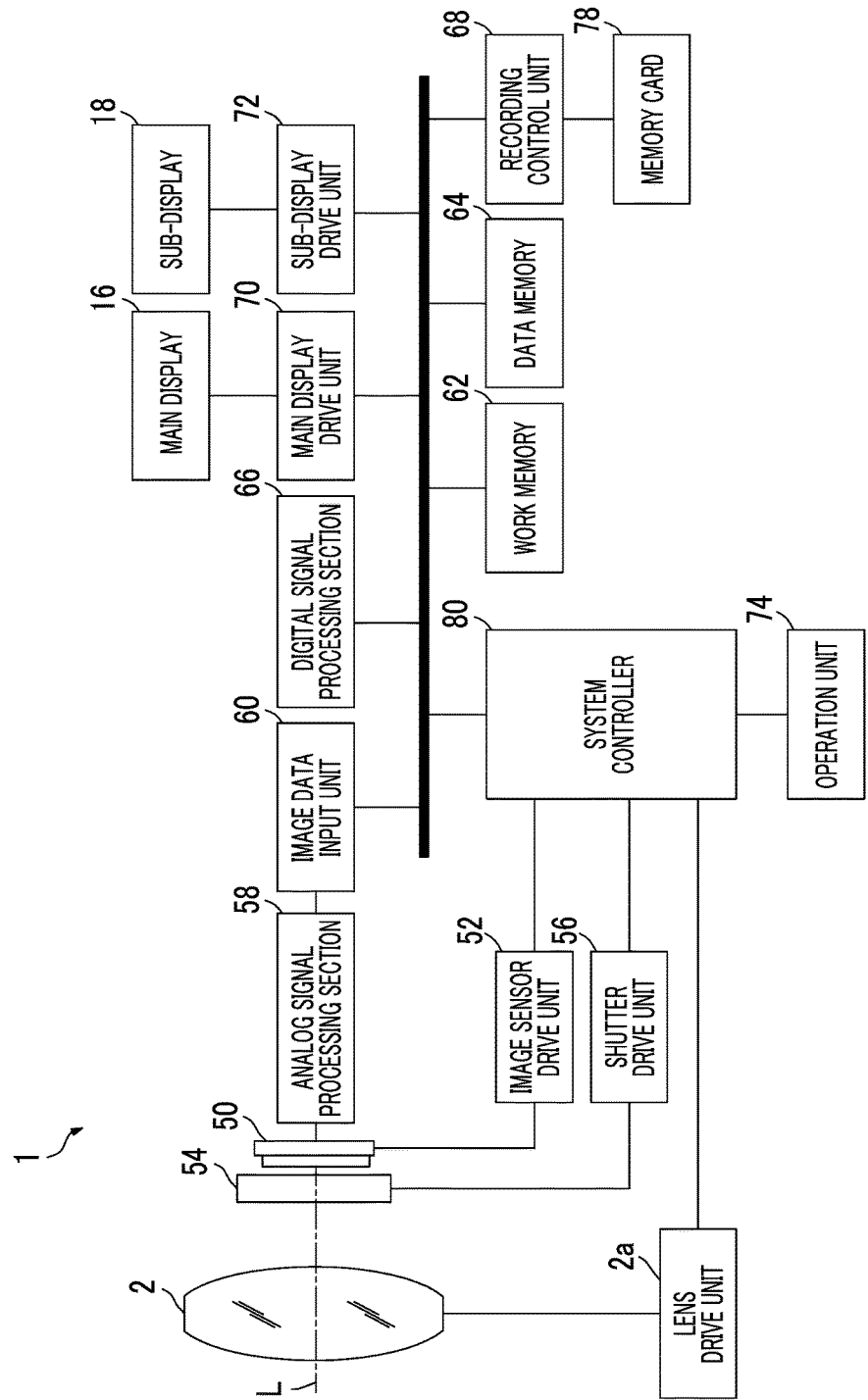
FIG. 6 is a block diagram showing the schematic configuration of a control system of the digital camera.

FIG. 6 is a block diagram showing the schematic configuration of a control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main display drive unit 70, a sub-display drive unit 72, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter, and is disposed directly in front of the image sensor 50.

The shutter drive unit 56 drives the shutter 54 according to a command output from the system controller 80.

The analog signal processing section 58 receives the signals output from the image sensor 50, and performs required signal processing, such as correlated double sampling processing and amplification processing. Further, the analog signal processing section 58 converts analog image signals, which have been subjected to required signal processing, into digital image signals and outputs the digital image signals.

The image data input unit 60 receives the digital image signals, which are output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 has access to the memory card 78 and reads and writes data according to a command output from the system controller 80. Image data, which is obtained from imaging, is recorded in the memory card 78.

The main display drive unit 70 drives the main display 16 according to a command output from the system controller 80.

The sub-display drive unit 72 drives the sub-display 18 according to a command output from the system controller 80.

The operation unit 74 includes the shutter button 30, the power supply lever 31, the front command dial 32, the sensitivity dial 110, the illumination button 35, the function button 36, the first rear command dial 37, the second rear command dial 38, the selector buttons 39, the menu button 40, the cancel button 41, the play button 42, the delete button 43, and the like. The operation unit 74 outputs a signal, which corresponds to the operation of each operation member, to the system controller 80.

The system controller 80 is a control unit that controls the operation of each unit of the digital camera 1. The system controller 80 is formed of a microcomputer. That is, the microcomputer functions as the system controller 80 by executing a predetermined control program, and functions as a control unit that controls the operation of each unit of the digital camera 1.

The system controller 80 also functions as a control unit for the lens 2. The system controller 80 controls the operation of the lens 2 through a lens drive unit 2*a* provided for the lens 2. The lens 2 includes a stop, a focus lens, and the like. The lens drive unit 2*a* includes a stop drive unit that drives the stop, a focus lens drive unit that drives the focus lens, and the like.

<<Sensitivity Setting Device>>

As described above, the digital camera 1 of this embodiment sets the sensitivity of imaging by the sensitivity dial 110.

Figure 7:
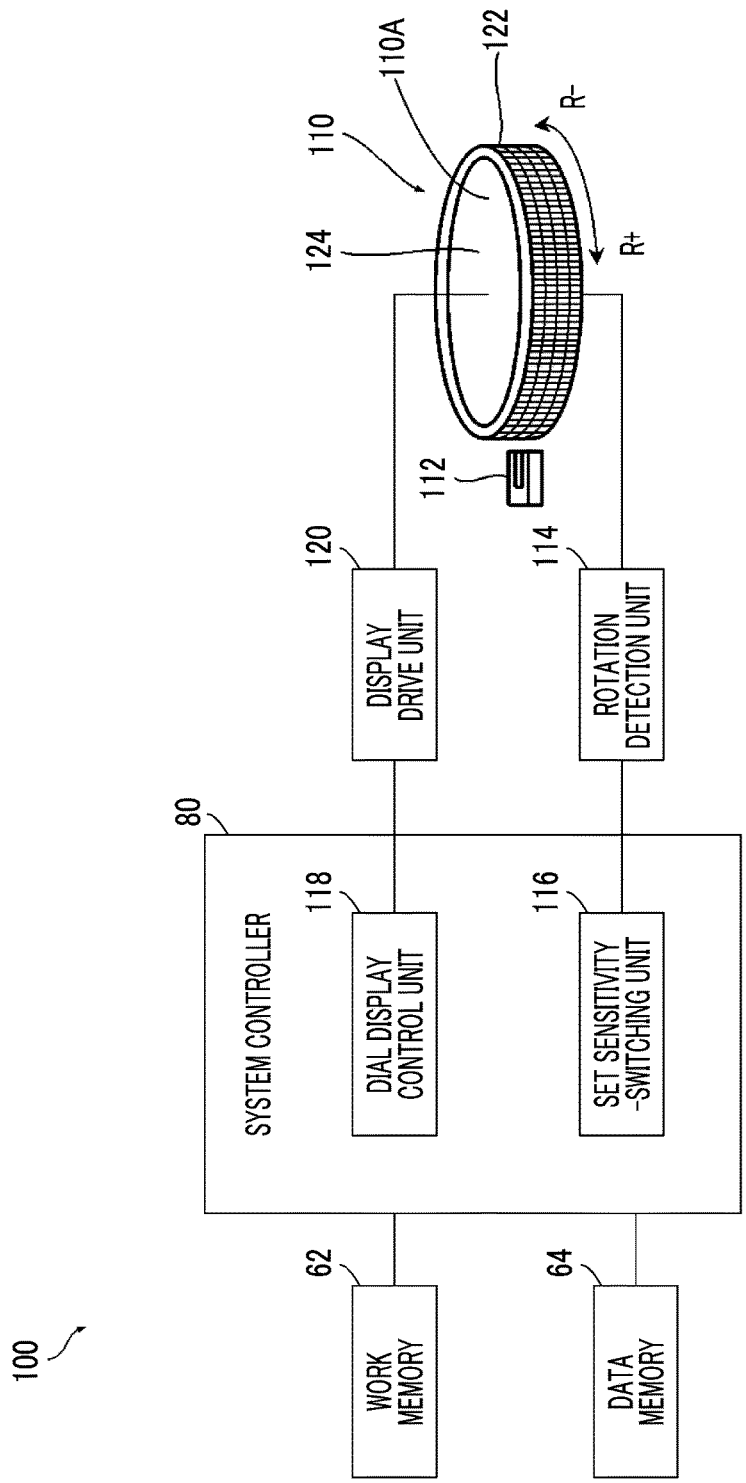
FIG. 7 is a block diagram showing the schematic configuration of a sensitivity setting device including a sensitivity dial.

FIG. 7 is a block diagram showing the schematic configuration of a sensitivity setting device including the sensitivity dial.

The sensitivity setting device 100 is an example of a setting device. The sensitivity setting device 100 includes the sensitivity dial 110 that includes a display section 110A on the upper surface thereof, an indicator 112, a rotation detection unit 114 that detects the rotation of the sensitivity dial 110, a set sensitivity-switching unit 116 that switches the set values of sensitivities according to the rotation of the sensitivity dial 110, and a dial display control unit 118 that controls a display on the display section 110A of the sensitivity dial 110 according to the switching of the set values of the sensitivities.

<Sensitivity Dial>

Figure 8:
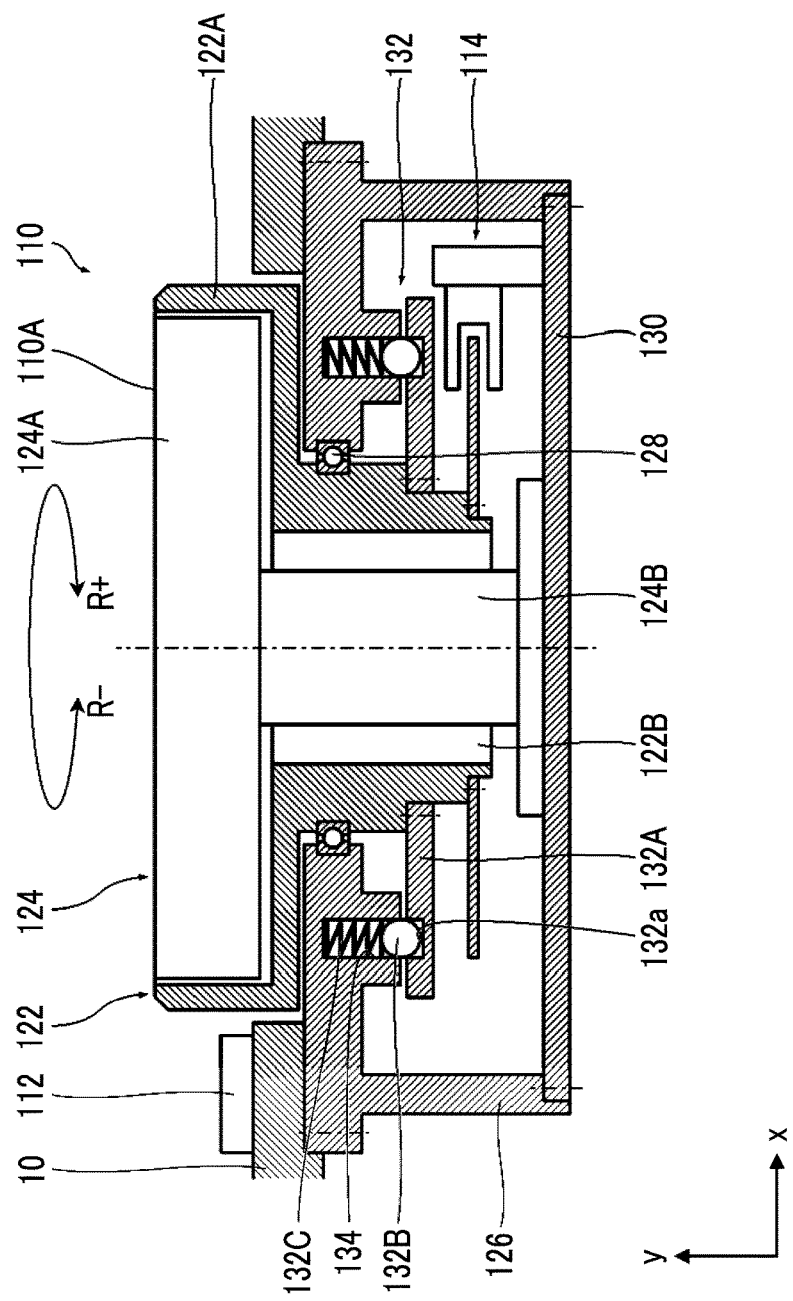
FIG. 8 is a longitudinal sectional view showing the schematic structure of the sensitivity dial.

FIG. 8 is a longitudinal sectional view showing the schematic structure of the sensitivity dial.

The sensitivity dial 110 is an example of an operation dial. The sensitivity dial 110 includes the display section 110A, which forms a dial plate, on the upper surface thereof. Settable sensitivities are displayed on the display section 110A of the sensitivity dial 110. The display aspect of the display section 110A will be described later.

The sensitivity dial 110 includes a sensitivity dial body 122 that is a portion to be rotationally operated, and a display unit 124 that forms the display section 110A.

The sensitivity dial body 122 includes a body portion 122A and a shaft portion 122B. The body portion 122A has the shape of a hollow disc of which the upper portion is opened. The outer periphery of the body portion 122A is subjected to knurling. The shaft portion 122B has a cylindrical shape. The shaft portion 122B is integrally provided at the lower portion of the body portion 122A so as to be coaxial with the body portion 122A.

The display unit 124 includes a display unit body 124A and a strut part 124B.

The display unit body 124A has the shape of a disc, and includes a display surface on the upper surface thereof. The display unit body 124A is disposed in the body portion 122A of the sensitivity dial body 122. The display surface of the display unit body 124A, which is disposed in the body portion 122A of the sensitivity dial body 122, forms the display section 110A of the sensitivity dial 110. The display unit body 124A is formed of, for example, a reflective liquid crystal display.

The strut part 124B is a support for the display unit body 124A, and has a columnar shape. The strut part 124B is disposed in the shaft portion 122B of the sensitivity dial body 122.

The sensitivity dial 110 is assembled with the camera body 10 through a sensitivity dial support frame 126.

The sensitivity dial support frame 126 is provided with a bearing 128 that supports the sensitivity dial body 122 so as to allow the sensitivity dial body 122 to be rotatable, a base plate 130 that fixes the display unit 124, a click mechanism 132 that generates click feelings in a case in which the sensitivity dial 110 is rotationally operated, and the rotation detection unit 114 that detects the rotation of the sensitivity dial 110, and the like.

The bearing 128 supports the shaft portion 122B of the sensitivity dial body 122 so as to allow the shaft portion 122B of the sensitivity dial body 122 to be rotatable. The strut part 124B of the display unit 124 is fixed to the base plate 130. The shaft portion 122B of the sensitivity dial body 122 is supported by the bearing 128 and the strut part 124B of the display unit 124 is fixed to the base plate 130, so that the sensitivity dial 110 is assembled with the sensitivity dial support frame 126. Accordingly, the display unit 124 is fixed, and the sensitivity dial body 122 is supported so as to be rotatable around the display unit 124 in a normal rotation direction and a reverse rotation direction. That is, only the outer peripheral portion is supported so as to be rotatable in a normal rotation direction and a reverse rotation direction while the display section 110A is fixed. In regard to a rotation direction, a rotation direction (clockwise direction) indicated by an arrow R+ is referred to as a normal rotation direction and a rotation direction (counterclockwise direction) indicated by an arrow R− is referred to as a reverse rotation direction.

The click mechanism 132 includes a click groove-metal plate 132A, click balls 132B, and click springs 132C.

The click groove-metal plate 132A has the shape of a disc that includes a circular hole at the center thereof. The shaft portion 122B of the sensitivity dial body 122 passes through the hole, which is formed at the center of the click groove-metal plate 132A, and the click groove-metal plate 132A is fixed coaxially with the shaft portion 122B of the sensitivity dial body 122.

The click groove-metal plate 132A is provided with click grooves 132*a* that are formed on the same circumference at regular intervals. The click grooves 132*a* are provided on the upper surface of the click groove-metal plate 132A as spherical depressions. The arrangement interval between the click grooves 132*a* becomes an interval at which a click feeling is generated. Further, the arrangement interval between the click grooves 132*a* becomes an interval at which the rotation of the sensitivity dial 110 is stopped. Furthermore, the number of the click grooves 132*a* becomes the number of click feelings that are generated per rotation. Moreover, the number of the click grooves 132*a* becomes the number of click positions per rotation. The click position means a position where rotation can be stopped with a click feeling. For example, in a case in which twenty click grooves 132*a* are provided at regular intervals, the number of click positions per rotation and the number of times of generation of click feelings per rotation becomes 20. In this case, a click feeling is generated at an interval of 18°.

The click balls 132B are members that are fitted to the click grooves 132*a* and generate click feelings. The click balls 132B are provided on the sensitivity dial support frame 126. The sensitivity dial support frame 126 is provided with click ball-receiving holes 134 that receive the click balls 132B. The click ball-receiving holes 134 are provided parallel to the rotation axis of the sensitivity dial 110 as bottom holes. Further, the click ball-receiving holes 134 are provided at positions facing the click grooves 132*a*.

The click springs 132C are members that bias the click balls 132B to the click groove-metal plate 132A. The click springs 132C are received in the click ball-receiving holes 134.

The action of the click mechanism 132 having the above-mentioned structure is as follows.

Since the click groove-metal plate 132A is mounted on the sensitivity dial 110, the click groove-metal plate 132A is also rotated in a case in which the sensitivity dial 110 is rotated. Further, in a case in which the click groove-metal plate 132A is rotated, the click balls 132B are fitted to the click grooves 132a at regular angular intervals. Accordingly, click feelings are generated at regular angular intervals. Further, in a case in which the rotation of the sensitivity dial 110 is stopped at the time of generation of a click feeling, the click balls 132B are fitted to the click grooves 132a. Accordingly, the rotation of the sensitivity dial 110 is stopped. That is, as long as the sensitivity dial 110 is not rotated with a load equal to or larger than a certain level, a state in which the sensitivity dial 110 is stopped is maintained.

The sensitivity dial 110 having the above-mentioned structure is supported so as to be endlessly rotatable in a normal rotation direction and a reverse rotation direction, and click feelings are generated at regular angular intervals as the sensitivity dial 110 is rotationally operated.

<Rotation Detection Unit>

The rotation detection unit 114 detects the rotation of the sensitivity dial 110. The rotation detection unit 114 is formed of a rotary encoder, and detects the rotation of the sensitivity dial 110 by detecting the rotation of the shaft portion 122B of the sensitivity dial body 122. Particularly, the rotation of the sensitivity dial 110 for each click is detected in the digital camera 1 of this embodiment. That is, the rotation of the sensitivity dial 110 corresponding to the number of clicks is detected. The detection result of the rotation detection unit 114 is output to the system controller 80.

<Indicator>

The indicator 112 is provided on the camera body 10. The indicator 112 has the shape of a bar, and is disposed so as to indicate one point on the outer periphery of the sensitivity dial 110. In the digital camera 1 of this embodiment, as shown in FIG. 3, the indicator 112 is disposed on the sensitivity dial 110 at a position corresponding to nine o'clock.

A user rotationally operates the sensitivity dial 110 relative to the indicator 112. That is, a user rotationally operates the sensitivity dial 110 so that the display of a sensitivity to be set is positioned at the position of the indicator 112.

<Set Sensitivity-Switching Unit>

The set sensitivity-switching unit 116 is an example of a set value switching unit, and switches the setting of sensitivities according to the rotation of the sensitivity dial 110 that is detected by the rotation detection unit 114. That is, the setting of sensitivities is increased or decreased one by one whenever the rotation corresponding to one click is detected. Increase is performed in a case in which the sensitivity dial 110 is rotated in the reverse rotation direction R−. Decrease is performed in a case in which the sensitivity dial 110 is rotated in the normal rotation direction R+. That is, in a case in which the sensitivity dial 110 is rotated in the normal rotation direction R+, a sensitivity is decreased according to the rotation angle of the sensitivity dial 110 (the number of clicks). In a case in which the sensitivity dial 110 is rotated in the reverse rotation direction R−, a sensitivity is increased according to the rotation angle of the sensitivity dial 110 (the number of clicks).

FIG. 9 is a table of ISO sensitivities that can be set by the digital camera.

As shown in FIG. 9, in the digital camera 1 of this embodiment, an ISO sensitivity can be set between ISO100 and 51200. Specifically, any one of ISO100, ISO125, ISO160, ISO200, ISO250, ISO320, ISO400, ISO500, ISO640, ISO800, ISO1000, ISO1250, ISO1600, ISO2000, ISO2500, ISO3200, ISO4000, ISO5000, ISO6400, ISO8000, ISO10000, ISO12800, ISO16000, ISO20000, ISO25600, ISO32000, ISO40000, and ISO51200 can be selected and set. In this case, the minimum value is ISO100 and the maximum value is ISO51200. Further, the number of ISO sensitivities to be switched is 28.

In a case in which a step width, which is obtained in a case in which an ISO sensitivity is switched to ISO200 from ISO100, is referred to as one step, the digital camera 1 of this embodiment switches ISO sensitivities with a step width of ⅓ step.

A sensitivity is switched in the above-mentioned order. Accordingly, for example, in a case in which a currently set sensitivity is ISO400 and the sensitivity dial 110 is rotated in the normal rotation direction R+ by an angle corresponding to one click, a sensitivity is switched to ISO320. Further, in a case in which the sensitivity dial 110 is rotated in the reverse rotation direction R− by an angle corresponding to one click, a sensitivity is switched to ISO500.

The data of settable sensitivities, that is, the data of the table shown in FIG. 9 is stored in the data memory 64. The set sensitivity-switching unit 116 reads the data of a settable sensitivity from the data memory 64, and switches the setting of sensitivities according to the rotation of the sensitivity dial 110 that is detected by the rotation detection unit 114.

The set sensitivity-switching unit 116 is provided as one function of the system controller 80. That is, the system controller 80 functions as the set sensitivity-switching unit 116 by executing a predetermined control program.

<Dial Display Contol Unit>

The dial display control unit 118 is an example of a display control unit, and controls a display on the display section 110A of the sensitivity dial 110. The dial display control unit 118 controls a display on the display section 110A of the sensitivity dial 110 according to the switching of sensitivities, which is performed by the set sensitivity-switching unit 116, and displays the image of the dial plate on the upper surface (top surface) of the sensitivity dial 110.

The dial display control unit 118 is provided as one function of the system controller 80. That is, the system controller 80 functions as the dial display control unit 118 by executing a predetermined control program. As shown in FIG. 7, the dial display control unit 118 controls the display unit 124 through a display drive unit 120 and controls a display on the display section 110A of the sensitivity dial 110.

<<Display Aspect of Display Section of Sensitivity Dial>>

The display aspect of the display section 110A of the sensitivity dial 110 will be described below.

Figure 10:
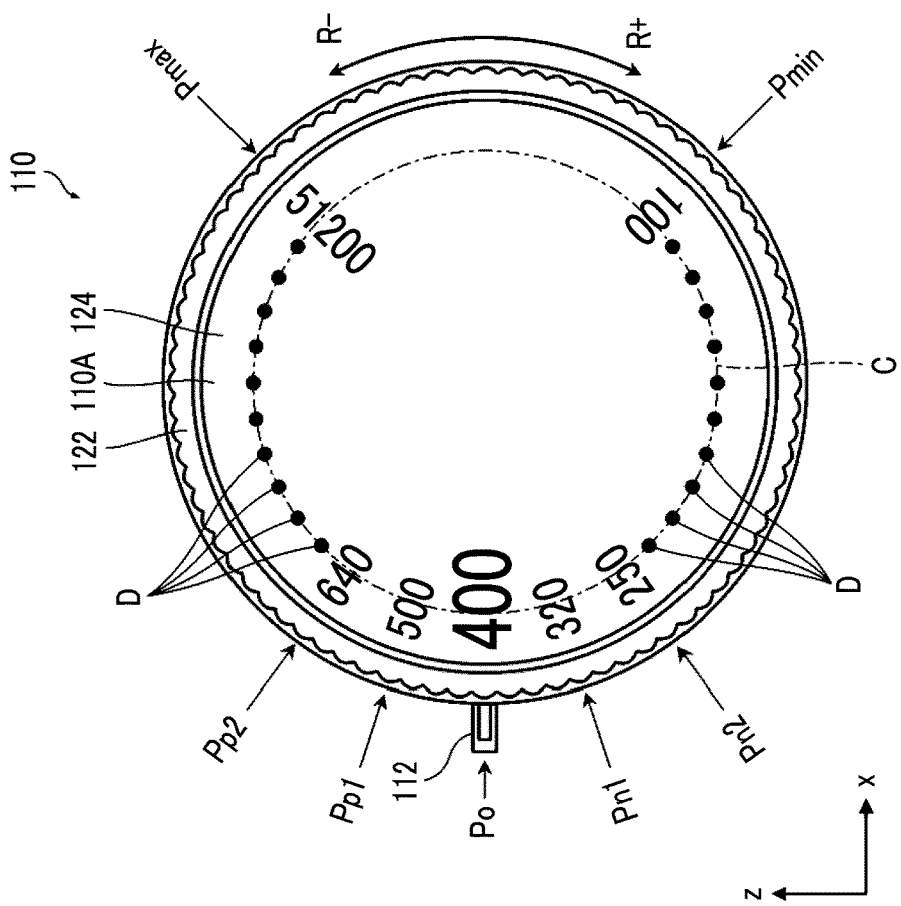
FIG. 10 is a top view of the sensitivity dial.

FIG. 10 is a top view of the sensitivity dial. FIG. 10 shows an example of the display aspect of the display section 110A of the sensitivity dial 110.

The dial display control unit 118 displays a currently selected sensitivity at a set value-display position Po that is set on the display section 110A. The set value-display position Po is set at a position that is indicated by the indicator 112. Since the indicator 112 is installed on the sensitivity dial 110 at a position corresponding to nine o'clock in the digital camera 1 of this embodiment, the set value-display position Po is set at the position corresponding to nine o'clock.

A case in which a currently selected sensitivity is ISO400 is shown in the example shown in FIG. 10. In this case, "400" is displayed at the set value-display position Po. A sensitivity, which is displayed at the set value-display position Po, is displayed so as to have a size larger than the sizes of sensitivities that are displayed on other regions.

In a case in which a currently selected sensitivity has a value other than the maximum value, the dial display control unit 118 displays the maximum value of a sensitivity at a maximum value-display position Pmax that is set on the downstream side of the set value-display position Po in the normal rotation direction R+. In the example shown in FIG. 10, the maximum value-display position Pmax is set at a position where the sensitivity dial 110 is rotated from the set value-display position Po in the normal rotation direction R+ by an angle of 135°. Since the maximum value of a sensitivity, which can be set by the digital camera 1 of this embodiment, is ISO51200 (see FIG. 9), "51200" is displayed at the maximum value-display position Pmax.

Further, in a case in which a currently selected sensitivity has a value other than the minimum value, the dial display control unit 118 displays the minimum value of a sensitivity at a minimum value-display position Pmin that is set on the upstream side of the set value-display position Po in the normal rotation direction R+. In the example shown in FIG. 10, the minimum value-display position Pmin is set at a position where the sensitivity dial 110 is rotated from the set value-display position Po in the reverse rotation direction R− by an angle of 135°.

Since the minimum value of a sensitivity, which can be set by the digital camera 1 of this embodiment, is ISO100 (see FIG. 9), "100" is displayed at the minimum value-display position Pmin.

Furthermore, the dial display control unit 118 displays a certain number of sensitivities, which are positioned ahead and are selectable in a case in which the sensitivity dial 110 is rotated in the reverse rotation direction R−, on the downstream side of the set value-display position Po in the normal rotation direction R+, and displays a certain number of sensitivities, which are positioned ahead and are selectable in a case in which the sensitivity dial 110 is rotated in the normal rotation direction R+, on the upstream side of the set value-display position Po in the normal rotation direction R+.

A case in which two selectable sensitivities, which are positioned ahead of the current setting in each direction, are displayed is shown in the example shown in FIG. 10. In this case, a first previous set value-display position Pp1 and a second previous set value-display position Pp2 are set on the downstream side of the set value-display position Po in the normal rotation direction R+, and a first next set value-display position Pn1 and a second next set value-display position Pn2 are set on the upstream side thereof.

A sensitivity, which is selectable in a case in which the sensitivity dial 110 is rotated in the reverse rotation direction R− by an angle corresponding to one click, is displayed at the first previous set value-display position Pp1. Since a sensitivity to be set next is ISO500 (see FIG. 9) in a case in which a currently set sensitivity is ISO400, "500" is displayed at the first previous set value-display position Pp1. In the example shown in FIG. 10, the first previous set value-display position Pp1 is set at a position where the sensitivity dial 110 is rotated from the set value-display position Po in the normal rotation direction R+ by an angle of 18°.

A sensitivity, which is selectable in a case in which the sensitivity dial 110 is rotated in the reverse rotation direction R− by an angle corresponding to two clicks, is displayed at the second previous set value-display position Pp2. Since a sensitivity to be set in the time after the next is ISO640 (see FIG. 9) in a case in which a currently set sensitivity is ISO400, "640" is displayed at the second previous set value-display position Pp2. In the example shown in FIG. 10, the second previous set value-display position Pp2 is set at a position where the sensitivity dial 110 is rotated from the set value-display position Po in the normal rotation direction R+ by an angle of 36°.

A sensitivity, which is selectable in a case in which the sensitivity dial 110 is rotated in the normal rotation direction R+ by an angle corresponding to one click, is displayed at the first next set value-display position Pn1. Since a sensitivity to be set next is ISO320 (see FIG. 9) in a case in which a currently set sensitivity is ISO400, "320" is displayed at the first next set value-display position Pn1. In the example shown in FIG. 10, the first next set value-display position Pn1 is set at a position where the sensitivity dial 110 is rotated from the set value-display position Po in the reverse rotation direction R− by an angle of 18°.

A sensitivity, which is selectable in a case in which the sensitivity dial 110 is rotated in the normal rotation direction R+ by an angle corresponding to two clicks, is displayed at the second next set value-display position Pn2. Since a sensitivity to be set in the time after the next is ISO250 (see FIG. 9) in a case in which a currently set sensitivity is ISO400, "250" is displayed at the second next set value-display position Pn2. In the example shown in FIG. 10, the second next set value-display position Pn2 is set at a position where the sensitivity dial 110 is rotated from the set value-display position Po in the reverse rotation direction R− by an angle of 36°.

Further, the dial display control unit 118 displays dots D between the set value-display position Po and the maximum value-display position Pmax in the normal rotation direction R+, and displays dots D between the set value-display position Po and the minimum value-display position Pmin in the reverse rotation direction R−. Since two selectable sensitivities, which are positioned ahead in each direction, are displayed in this embodiment, dots D are displayed between the second previous set value-display position Pp2 and the maximum value-display position Pmax and between the second next set value-display position Pn2 and the minimum value-display position Pmin. The dots D are displayed at regular intervals. The dots D are to allow a user to recognize that settable sensitivities are thinned out and displayed.

The respective sensitivities including the dots D are displayed on a circle C shown by an alternate long and short dash line. That is, the respective sensitivities including the dots D are displayed on the same circle in the rotation direction. The circle C shown by an alternate long and short dash line is a circle that is shown for convenience of description. The circle C is not displayed on the actual display section 110A.

(A), (B), and (C) of FIG. 11 are diagrams showing an example of the transition state of a display on a display section that is in conjunction with the operation of the sensitivity dial. In (A), (B), and (C) of FIG. 11, arrows R+1 indicate a transition direction in a case in which the sensitivity dial 110 is rotated in the normal rotation direction R+ by an angle corresponding to one click, and an arrow R+2 indicates a transition direction in a case in which the sensitivity dial 110 is rotated in the normal rotation direction R+ by an angle corresponding to two clicks. Further, arrows R−1 indicate a transition direction in a case in which the sensitivity dial 110 is rotated in the reverse rotation direction R− by an angle corresponding to one click, and an arrow R−2 indicates a transition direction in a case in which the sensitivity dial 110 is rotated in the reverse rotation direction R− by an angle corresponding to two clicks.

An ISO sensitivity, which is currently set by the sensitivity setting device 100, is ISO400.

(A) of FIG. 11 shows an example of a display on the display section 110A in a case in which a current sensitivity is set to ISO400. In this case, "400" is displayed at the set value-display position Po. Further, "500" is displayed at the first previous set value-display position Pp1, "640" is displayed at the second previous set value-display position Pp2, "320" is displayed at the first next set value-display position Pn1, and "250" is displayed at the second next set value-display position Pn2.

In a case in which the sensitivity dial 110 is rotated from the state shown in (A) of FIG. 11 in the normal rotation direction R+ by an angle corresponding to one click, the set value of a sensitivity is decreased by one step and is set to ISO320.

(B) of FIG. 11 shows an example of a display on the display section 110A in a case in which a sensitivity is switched to ISO320. In this case, "320" is displayed at the set value-display position Po. Further, "400" is displayed at the first previous set value-display position Pp1, "500" is displayed at the second previous set value-display position Pp2, "250" is displayed at the first next set value-display position Pn1, and "200" is displayed at the second next set value-display position Pn2. That is, sensitivities are decreased by one step and are displayed at the respective positions.

On the other hand, in a case in which the sensitivity dial 110 is rotated from the state shown in (A) of FIG. 11 in the reverse rotation direction R− by an angle corresponding to one click, the set value of a sensitivity is increased by one step and is set to ISO500.

(C) of FIG. 11 shows an example of a display on the display section 110A in a case in which a sensitivity is switched to ISO500. In this case, "500" is displayed at the set value-display position Po. Further, "640" is displayed at the first previous set value-display position Pp1, "800" is displayed at the second previous set value-display position Pp2, "400" is displayed at the first next set value-display position Pn1, and "320" is displayed at the second next set value-display position Pn2. That is, sensitivities are increased by one step and are displayed at the respective positions.

In a case in which the sensitivity dial 110 is rotated in the normal rotation direction R+ by an angle corresponding to one click as described above, sensitivities are decreased by one step and the sensitivities of the display section 110A are also decreased by one step and are displayed. Further, in a case in which the sensitivity dial 110 is rotated in the reverse rotation direction R− by an angle corresponding to one click, sensitivities are increased by one step and the sensitivities of the display section 110A are also increased by one step and are displayed.

In a case in which the sensitivity dial 110 is rotated from the state shown in (C) of FIG. 11 in the normal rotation direction R+ by an angle corresponding to two clicks, the set value of a sensitivity is decreased by two steps and is set to ISO320. In this case, a display on the display section 110A becomes like (B) of FIG. 11.

Further, in a case in which the sensitivity dial 110 is rotated from the state shown in (C) of FIG. 11 in the normal rotation direction R+ by an angle corresponding to one click, the set value of a sensitivity is decreased by one step and is set to ISO400. In this case, a display on the display section 110A becomes like (A) of FIG. 11.

Furthermore, in a case in which the sensitivity dial 110 is rotated from the state shown in (B) of FIG. 11 in the reverse rotation direction R− by an angle corresponding to two clicks, the set value of a sensitivity is decreased by two steps and is set to ISO500. In this case, a display on the display section 110A becomes like (C) of FIG. 11.

Moreover, in a case in which the sensitivity dial 110 is rotated from the state shown in (B) of FIG. 11 in the reverse rotation direction R− by an angle corresponding to one click, the set value of a sensitivity is increased by one step and is set to ISO400. In this case, a display on the display section 110A becomes like (A) of FIG. 11.

It is preferable that a display is rotated in conjunction with the rotation of the sensitivity dial 110 in a case in which a display on the display section 110A is to be switched. That is, it is preferable that only a numerical value is not just switched and a display is rotated about the rotation axis of the sensitivity dial 110 so as to be actually rotated (a display is made through animation so as to look like that the dial plate is rotated). Accordingly, since the operating direction of rotation becomes clear, operability is further improved.

FIG. 12 is a diagram showing an example of a display on the display section in a case in which a currently set sensitivity is ISO160.

In this case, the minimum value of a settable sensitivity is displayed at the second next set value-display position Pn2. That is, "100" is displayed at the second next set value-display position Pn2.

Since the minimum value of a settable sensitivity is displayed at the second next set value-display position Pn2, the display of the minimum value-display position Pmin disappears.

As the display of the minimum value at the minimum value-display position Pmin disappears, the display of the dots between the second next set value-display position Pn2 and the minimum value-display position Pmin also disappears.

FIG. 13 is a diagram showing an example of a display on the display section in a case in which a currently set sensitivity has the minimum value of a settable sensitivity.

In this case, the minimum value of a settable sensitivity is displayed at the set value-display position Po. That is, "100" is displayed at the set value-display position Po. Since the minimum value of a settable sensitivity is displayed at the set value-display position Po, nothing is displayed on the upstream side of the set value-display position Po in the normal rotation direction R+.

FIG. 14 is a diagram showing an example of a display on the display section in a case in which a currently set sensitivity is ISO32000.

In this case, the maximum value of a settable sensitivity is displayed at the second previous set value-display position Pp2. That is, "51200" is displayed at the second previous set value-display position Pp2.

Since the maximum value of a settable sensitivity is displayed at the second previous set value-display position Pp2, the display of the maximum value-display position Pmax disappears.

As the display of the maximum value at the maximum value-display position Pmax disappears, the display of the dots between the second previous set value-display position Pp2 and the maximum value-display position Pmax also disappears.

FIG. 15 is a diagram showing an example of a display on the display section in a case in which a currently set sensitivity has the maximum value of a settable sensitivity.

In this case, the maximum value of a settable sensitivity is displayed at the set value-display position Po. That is, "51200" is displayed at the set value-display position Po. Since the maximum value of a settable sensitivity is displayed at the set value-display position Po, nothing is displayed on the downstream side of the set value-display position Po in the normal rotation direction R+.

As described above, a currently set sensitivity, the maximum value and the minimum value of a settable sensitivity, and two selectable sensitivities, which are positioned ahead of the currently set sensitivity in each direction, are displayed on the display section 110A of the sensitivity dial 110, and sensitivities of a middle portion are thinned out and displayed.

Since the maximum value and the minimum value of a settable sensitivity are displayed, the range of selectable sensitivities can be easily grasped.

Further, since two selectable sensitivities, which are positioned ahead of a currently set sensitivity in each direction, are displayed in addition to the currently set sensitivity, the next settable sensitivity can be easily grasped. Furthermore, since two selectable sensitivities, which are positioned ahead of a currently set sensitivity in each direction, are displayed in addition to the currently set sensitivity, the step width of a change can also be easily grasped.

Moreover, since a currently set sensitivity is displayed to be larger than other displays, the currently set sensitivity can be instantly grasped.

Further, since sensitivities of a middle portion where sensitivities are thinned out are displayed by dots, it is possible to allow a user to easily recognize that sensitivities are thinned out and displayed.

Furthermore, since sensitivities of a middle portion are thinned out and displayed, necessary information can be displayed to be large. Accordingly, a display can be made to be easily seen even though the display section itself is small. Moreover, since sensitivities of a middle portion are thinned out and displayed, the outer diameter of the sensitivity dial 110 can also be reduced.

<<Processing for Set Sensitivity by Sensitivity Setting Device>>

FIG. 16 is a flowchart showing the procedure of processing for setting a sensitivity by the sensitivity setting device.

In a case in which power is supplied to the digital camera 1, the setting of a previous sensitivity is read (Step S10). That is, information on a sensitivity, which is set in a case in which the power supply is turned off, is read. Setting information of a sensitivity in a case in which the power supply is turned off is recorded in the data memory 64. The set sensitivity-switching unit 116 reads information on the setting of a previous sensitivity from the data memory 64. The set sensitivity-switching unit 116 sets the read sensitivity as a currently set sensitivity (Step S11).

In a case in which a sensitivity is set, the image of the dial plate corresponding to the currently set sensitivity is displayed on the display section 110A of the sensitivity dial 110 (Step S12). For example, in a case in which the currently set sensitivity is ISO400, the display of the currently set sensitivity becomes a display shown in FIG. 10. The dial display control unit 118 controls a display on the display section 110A of the sensitivity dial 110 according to the currently set sensitivity so that a predetermined display is made.

After that, it is determined whether or not the sensitivity dial 110 is operated (Step S13). If the sensitivity dial 110 is operated, the setting of sensitivities is switched according to the rotation direction and the rotation angle of the sensitivity dial 110 (Step S14). For example, in a case in which the sensitivity dial 110 is rotated in the normal rotation direction R+ by an angle corresponding to one click, a sensitivity is decreased by one step. In a case in which the sensitivity dial 110 is rotated in the normal rotation direction R+ by an angle corresponding to two clicks, a sensitivity is decreased by two steps. On the other hand, in a case in which the sensitivity dial 110 is rotated in the reverse rotation direction R− by an angle corresponding to one click, a sensitivity is increased by one step. In a case in which the sensitivity dial 110 is rotated in the reverse rotation direction R− by an angle corresponding to two clicks, a sensitivity is increased by two steps.

A display on the display section 110A of the sensitivity dial 110 is switched according to the switching of the sensitivities (Step S15). For example, in a case in which the setting of a current sensitivity corresponds to ISO400 as shown in (A) of FIG. 11 and a sensitivity is decreased by one step, ISO320 is displayed at the set value-display position Po as shown in (B) of FIG. 11. In a case in which a sensitivity is increased by one step, ISO500 s displayed at the set value-display position Po as shown in (C) of FIG. 11.

After that, it is determined whether or not the power supply is turned off (Step S16). If the power supply is not turned off, the procedure returns to Step S13 and the above-mentioned processing is repeatedly performed.

If the power supply is turned off, the setting of a current sensitivity is written in the data memory 64 (Step S17) and processing ends.

MODIFICATION EXAMPLES

<Display Aspect of Display Section of Sensitivity Dial>

FIG. 17 is a diagram showing another example of the display aspect of the display section of the sensitivity dial.

Sensitivities of a middle portion where sensitivities are thinned out are displayed by dots as described above, it is possible to allow a user to easily recognize that sensitivities are thinned out and displayed.

The dots are displayed at regular intervals in the aspect shown in FIG. 10. In this aspect, the dots are displayed according to the number of sensitivities that are thinned out. Specifically, dots as many as the number of sensitivities that are thinned out between a sensitivity displayed at the second previous set value-display position Pp2 and a sensitivity displayed at the maximum value-display position Pmax, that is, the number of selectable sensitivities therebetween are displayed between the second previous set value-display position Pp2 and the maximum value-display position Pmax. Further, the dots are displayed according to the number of sensitivities that are thinned out. Specifically, dots as many as the number of sensitivities that are thinned out between a sensitivity displayed at the second next set value-display position Pn2 and a sensitivity displayed at the minimum value-display position Pmin, that is, the number of selectable sensitivities therebetween are displayed between the second next set value-display position Pn2 and the minimum value-display position Pmin.

In the case of the example shown in FIG. 17, ISO640 is displayed at the second previous set value-display position Pp2 and ISO51200 is displayed at the maximum value-display position Pmax. In this case, the number of sensitivities, which are thinned out between a sensitivity displayed at the second previous set value-display position Pp2 and a sensitivity displayed at the maximum value-display position Pmax, is 18 (see FIG. 9). Accordingly, in this case, eighteen dots D are displayed between the second previous set value-display position Pp2 and the maximum value-display position Pmax. The respective dots D are arranged at regular intervals in the normal rotation direction R+.

Further, ISO250 is displayed at the second next set value-display position Pn2 and ISO100 is displayed at the minimum value-display position Pmin. In this case, the number of sensitivities, which are thinned out between a sensitivity displayed at the second next set value-display position Pn2 and a sensitivity displayed at the minimum value-display position Pmin, is 3 (see FIG. 9). Accordingly, in this case, three dots D are displayed between the second next set value-display position Pn2 and the minimum value-display position Pmin. The respective dots D are arranged at regular intervals in the reverse rotation direction R−.

Since the dots D are displayed according to the number of sensitivities that are thinned out as described above, the number of sensitivities, which are thinned out, can be easily grasped.

FIG. 18 is a diagram showing another example of the display aspect of the display section of the sensitivity dial.

In this example, only a sensitivity that is currently set on the display section 110A of the sensitivity dial 110, the maximum value of a selectable sensitivity, and the minimum value of a selectable sensitivity are displayed on the display section 110A.

In a case in which the display area of the display section 110A of the sensitivity dial 110 is small, at least a currently set sensitivity, the maximum value of a selectable sensitivity, and the minimum value of a selectable sensitivity are displayed as described above. In this case, sensitivities of a middle portion are displayed by the dots D. Further, it is preferable that the dots D are displayed according to the number of sensitivities thinned out.

A case in which a currently set sensitivity is ISO2000 is shown in the example shown in FIG. 18. In this case, as shown in FIG. 18, "2000" is displayed at the set value-display position Po. Further, "51200" is displayed at the maximum value-display position Pmax and "100" is displayed at the minimum value-display position Pmin. Since fourteen selectable sensitivities are present between a sensitivity displayed at the set value-display position Po and the maximum value (see FIG. 9), fourteen dots D are displayed between the set value-display position Po and the maximum value-display position Pmax. Further, thirteen selectable sensitivities are present between a sensitivity displayed at the set value-display position Po and the minimum value (see FIG. 9), thirteen dots D are displayed between the set value-display position Po and the minimum value-display position Pmin.

FIG. 19 is a diagram showing another example of the display aspect of the display section of the sensitivity dial.

In this example, a sensitivity that is currently set on the display section 110A of the sensitivity dial 110, the maximum value of a selectable sensitivity, the minimum value of a selectable sensitivity, and one selectable sensitivity that is positioned ahead of the current setting in each direction are displayed on the display section 110A.

The number of sensitivities, which are displayed ahead of and behind a currently set sensitivity, can be appropriately increased or decreased as described above. In a case in which the display area of the display section 110A of the sensitivity dial 110 is small, only one selectable sensitivity that is positioned ahead of the currently set sensitivity in each direction may be displayed as in this example.

In this example, the currently set sensitivity is displayed to be large in exchange for displaying one sensitivity ahead of the currently set sensitivity and displaying one sensitivity behind the currently set sensitivity. Accordingly, the currently set sensitivity can be made to be more easily seen.

In a case in which only one sensitivity, which is positioned ahead of the currently set sensitivity in each direction is displayed as in this example, a previous set value-display position Pp is set on the downstream side of the set value-display position Po in the normal rotation direction R+ and a next set value-display position Pn is set on the upstream side thereof.

A case in which a currently set sensitivity is ISO400 is shown in the example shown in FIG. 19. In this case, ISO500, which is the next sensitivity of ISO400, is displayed at the previous set value-display position Pp and ISO320, which is a sensitivity positioned right before ISO400, is displayed at the next set value-display position Pn (see FIG. 9).

Even in this case, it is preferable that dots D, which are displayed between the previous set value-display position Pp and the maximum value-display position Pmax and between the next set value-display position Pn and the minimum value-display position Pmin, are displayed as many as the number of sensitivities thinned out.

<<Change in Step Width>>

The step width of the switching of sensitivities has been fixed (⅓ step) in the above-mentioned embodiment, but a user can also randomly change the step width. For example, any one of ⅓ step, ½ step, and one step can be selected.

FIG. 20 is a table of settable sensitivities in a case in which an ISO sensitivity is changed with step widths of ⅓ step, ½ step, and one step. FIG. 20 shows a case in which an ISO sensitivity is set between ISO100 and ISO51200.

As shown in FIG. 20, an ISO sensitivity can be set by ⅓ step in a case in which a step width is set to ⅓ step. Specifically, any one of ISO100, ISO125, ISO160, ISO200, ISO250, ISO320, ISO400, ISO500, ISO640, ISO800, ISO1000, ISO1250, ISO1600, ISO2000, ISO2500, ISO3200, ISO4000, ISO5000, ISO6400, ISO8000, ISO10000, ISO12800, ISO16000, ISO20000, ISO25600, ISO32000, ISO40000, and ISO51200 can be selected. In this case, the number of selectable sensitivities is 28.

An ISO sensitivity can be set by ½ step in a case in which a step width is set to ½ step. Specifically, any one of ISO100, ISO140, ISO200, ISO280, ISO400, ISO560, ISO800, ISO1100, ISO1600, ISO2200, ISO3200, ISO4500, ISO6400, ISO9000, ISO12800, ISO18000, ISO25600, ISO36000, and ISO51200 can be selected. In this case, the number of selectable sensitivities is 19.

An ISO sensitivity can be set by one step in a case in which a step width is set to one step. Specifically, any one of ISO100, ISO200, ISO400, ISO800, ISO1600, ISO3200, ISO6400, ISO12800, ISO25600, and ISO51200 can be selected. In this case, the number of selectable sensitivities is 10.

FIG. 21 is a block diagram showing the schematic configuration of a sensitivity setting device that has a function to change a step width.

The sensitivity setting device 100 includes a step width changing unit 140. The step width changing unit 140 changes a step width on the basis of an instruction output from the operation unit 74. For example, in a case in which ⅓ step is instructed as a step width of the setting of sensitivities, a sensitivity is set so as to be switched by ⅓ step. Likewise, in a case in which ½ step is instructed as a step width of the setting of sensitivities, a sensitivity is set so as to be switched by ½ step.

The set sensitivity-switching unit 116 switches sensitivities on the basis of the step width that is changed by the step width changing unit 140. For example, in a case in which a step width is set to ⅓ step, the set sensitivity-switching unit 116 switches sensitivities by ⅓ step. Likewise, in a case in which a step width is set to ½ step, the set sensitivity-switching unit 116 switches sensitivities by ½ step. In a case in which a step width is set to one step, the set sensitivity-switching unit 116 switches sensitivities by one step.

FIG. 22 is a diagram showing an example of a display on the display section of the sensitivity dial in a case in which a step width of the setting of sensitivities is set to ½ step. FIG. 22 shows an example of a case in which ISO400 is selected.

In this case, ISO400, which is a currently set sensitivity, is displayed at the set value-display position Po.

Further, ISO560, that is, a sensitivity, which is selectable in a case in which the sensitivity dial 110 is rotated in the reverse rotation direction R− by an angle corresponding to one click, is displayed at the first previous set value-display position Pp1; and ISO800, that is, a sensitivity, which is selectable in a case in which the sensitivity dial 110 is rotated in the reverse rotation direction R− by an angle corresponding to two clicks, is displayed at the second previous set value-display position Pp2 (see FIG. 20).

Furthermore, ISO280, that is, a sensitivity, which is selectable in a case in which the sensitivity dial 110 is rotated in the normal rotation direction R+ by an angle corresponding to one click, is displayed at the first next set value-display position Pn1; and ISO140, that is, a sensitivity, which is selectable in a case in which the sensitivity dial 110 is rotated in the normal rotation direction R+ by an angle corresponding to two clicks, is displayed at the second next set value-display position Pn2.

In the case of this example, there is no sensitivity that is thinned out between the sensitivity displayed at the second next set value-display position Pn2 and the sensitivity displayed at the minimum value-display position Pmin. Accordingly, dots are not displayed between the second next set value-display position Pn2 and the minimum value-display position Pmin.

On the other hand, dots D of which the number corresponds to the number of sensitivities thinned out are displayed between the second next set value-display position Pn2 and the maximum value-display position Pmax. Since the number of sensitivities thinned out is 11 (see FIG. 20), eleven dots D are displayed.

FIG. 23 is a diagram showing an example of a display on the display section of the sensitivity dial in a case in which a step width of the setting of sensitivities is set to one step. FIG. 23 shows an example of a case in which ISO400 is selected.

In this case, ISO400, which is a currently set sensitivity, is displayed at the set value-display position Po.

Further, ISO800, that is, a sensitivity, which is selectable in a case in which the sensitivity dial 110 is rotated in the reverse rotation direction R− by an angle corresponding to one click, is displayed at the first previous set value-display position Pp1; and ISO1600, that is, a sensitivity, which is selectable in a case in which the sensitivity dial 110 is rotated in the reverse rotation direction R− by an angle corresponding to two clicks, is displayed at the second previous set value-display position Pp2 (see FIG. 20).

Furthermore, ISO200, that is, a sensitivity, which is selectable in a case in which the sensitivity dial 110 is rotated in the normal rotation direction R+ by an angle corresponding to one click, is displayed at the first next set value-display position Pn1; and ISO100, that is, a sensitivity, which is selectable in a case in which the sensitivity dial 110 is rotated in the normal rotation direction R+ by an angle corresponding to two clicks, is displayed at the second next set value-display position Pn2.

In the case of this example, the minimum value of a selectable sensitivity is displayed at the second next set value-display position Pn2. For this reason, nothing is displayed at the minimum value-display position Pmin. Further, dots are also not displayed between the second next set value-display position Pn2 and the minimum value-display position Pmin.

On the other hand, dots D of which the number corresponds to the number of sensitivities thinned out are displayed between the second next set value-display position Pn2 and the maximum value-display position Pmax. Since the number of sensitivities thinned out is 4, four dots D are displayed.

A display, which is obtained in a case in which a step width of the setting of sensitivities is set to ⅓ step, is as shown in FIG. 17.

Since a step width of the setting of sensitivities can be changed by a user as described above, operability can be further improved.

Further, since a display is changed even in a case in which a step width is changed as described above, the function can be realized by a simple structure.

As described above, an operation for changing a step width is performed by the operation unit 74. An operation method is not particularly limited. For example, an item for setting a step width may be prepared on a setting menu for imaging conditions and an operation for changing a step width may be performed on the setting menu for imaging conditions. Alternatively, a dedicated button may be prepared and a step width may be switched whenever the button is pressed.

Further, a step width is adapted to be switched in three steps in the above-mentioned example, but the number of switching steps is not limited. The number of switching steps can be increased or decreased as necessary.

<<Switching According to Rotatinal Speed>>

A step width is switched by a user in the above-mentioned example, but may be automatically switched. In this case, in a case in which a step width is automatically switched according to the rotational speed of the sensitivity dial 110, operability can be further improved. For example, a step width is set to be large with an increase in the rotational speed. Accordingly, a sensitivity can be quickly set to desired setting. Further, a step width is reduced with a reduction in the rotational speed. Accordingly, a sensitivity can be finely set.

FIG. 24 is a block diagram showing the schematic configuration of a sensitivity setting device that has a function to change a step width according to the rotational speed of the sensitivity dial.

A rotation detection unit 114a detects the rotation of the sensitivity dial 110 for each click and detects the rotational speed of the sensitivity dial 110.

The step width changing unit 140 acquires information on the rotational speed of the sensitivity dial 110, which is detected by the rotation detection unit 114a, and changes a step width on the basis of the acquired information. Specifically, in a case in which the rotational speed Sv of the sensitivity dial 110 is equal to or lower than a first threshold value S1, a step width of the switching of ISO sensitivities is set to ⅓ step. Further, in a case in which the rotational speed Sv of the sensitivity dial 110 is equal to or higher than a second threshold value S2, a step width of the switching of ISO sensitivities is set to one step. In the other case, that is, in a case in which the rotational speed Sv of the sensitivity dial 110 satisfies "S1<Sv<S2", a step width of the switching of ISO sensitivities is set to ½ step.

Accordingly, since an ISO sensitivity is changed by one step in a case in which the sensitivity dial 110 is rotated at a high speed, an ISO sensitivity can be quickly set to a target sensitivity. On the other hand, since an ISO sensitivity is changed by ⅓ step in a case in which the sensitivity dial 110 is rotated at a low speed, an ISO sensitivity can be finely set.

FIG. 25 is a flowchart showing the procedure of processing in a case in which a step width is automatically switched according to the rotational speed of the sensitivity dial.

It is determined whether or not the sensitivity dial 110 is operated (Step S20). If the sensitivity dial 110 is operated, it is determined whether or not the rotational speed Sv of the sensitivity dial 110 is equal to or lower than the first threshold value S1 (Sv≤S1) (Step S21).

If the rotational speed Sv of the sensitivity dial 110 is equal to or lower than the first threshold value S1, a step width is set to ⅓ step (Step S22). A case in which the rotational speed Sv of the sensitivity dial 110 is equal to or lower than the first threshold value S1 is a case in which the sensitivity dial 110 is rotationally operated at a low speed. In this case, a step width is set to be small so that an ISO sensitivity can be finely set.

If the rotational speed Sv of the sensitivity dial 110 is not equal to or lower than the first threshold value S1, it is determined whether or not the rotational speed Sv is equal to or higher than the second threshold value S2 (S2≤Sv) (Step S23).

If the rotational speed Sv of the sensitivity dial 110 is equal to or higher than the second threshold value S2, a step width is set to one step (Step S24). A case in which the rotational speed Sv of the sensitivity dial 110 is equal to or higher than the second threshold value S2 is a case in which the sensitivity dial 110 is rotationally operated at a high speed. In this case, a step width is set to be large so that an ISO sensitivity can be significantly switched.

On the other hand, if the rotational speed Sv of the sensitivity dial 110 is not equal to or higher than the second threshold value S2, a step width is set to ½ step (Step S25). In this case, it is regarded that the sensitivity dial 110 is rotationally operated at a normal rotational speed, and a step width is set to a medium step width.

After that, the setting of sensitivities is switched on the basis of the set step width, a rotation direction, and a rotation angle (Step S26). Then, a display on the display section 110A of the sensitivity dial 110 is switched according to the switching of the setting of sensitivities (Step S27).

After that, it is determined whether or not the power supply is turned off (Step S28). If the power supply is not turned off, the procedure returns to Step S20 and the above-mentioned processing is repeatedly performed. If the power supply is turned off, the setting of a current sensitivity is written in the data memory 64 (Step S29) and processing ends.

Since a step width for switching is automatically switched according to the rotational speed of the sensitivity dial 110 as described above, operability can be further improved.

A step width is changed in three steps in the above-mentioned example, but the number of switching steps is not limited. The number of switching steps is not limited thereto. For example, a step width may reduced only in a case in which the sensitivity dial is rotationally operated at a speed equal to or lower than a certain speed. Further, a step width may be set to be large only in a case in which the sensitivity dial is rotationally operated at a speed equal to or higher than a certain speed.

<<Other Examples of Operation Dial>>

A case in which the invention is applied to a sensitivity dial has been described by way of example in the above-mentioned embodiment, but the application of the invention is not limited thereto.

<Shutter Speed Dial>

FIG. 26 is a diagram showing an example of a display on the display section in a case in which the operation dial is used as a shutter speed dial.

FIG. 26 shows an example of a display on the shutter speed dial that can select 1, ½, ¼, ⅛, 1/15, 1/30, 1/60, 1/125, 1/250, 1/500, 1/1000, 1/2000, 1/4000, and 1/8000 (sec.) as a shutter speed. In this case, the minimum value of a selectable shutter speed is 1 (sec.) and the maximum value thereof is 1/8000 (sec.)

Further, FIG. 26 shows a case in which 1/60 (sec.) is selected. In this case, "60" representing 1/60 (sec.) is displayed at the set value-display position Po.

The display of a shutter speed is a reciprocal. That is, displays on the display section in regard to shutter speeds of 1, ½, ¼, ⅛, 1/15, 1/30, 1/60, 1/125, 1/250, 1/500, 1/1000, 1/2000, 1/4000, and 1/8000 (sec.) become 1, 2, 4, 8, 15, 30, 60, 125, 250, 500, 1000, 2000, 4000, and 8000, respectively.

A shutter speed, which is selectable in a case in which the shutter speed dial is rotated in the reverse rotation direction R− by an angle corresponding to one click, is displayed at the first previous set value-display position Pp1. This shutter speed is 1/125 (sec.).

A shutter speed, which is selectable in a case in which the shutter speed dial is rotated in the reverse rotation direction R− by an angle corresponding to two clicks, is displayed at the second previous set value-display position Pp2. This shutter speed is 1/250 (sec.).

A shutter speed, which is selectable in a case in which the shutter speed dial is rotated in the normal rotation direction R+ by an angle corresponding to one click, is displayed at the first next set value-display position Pn1. This shutter speed is 1/30 (sec.).

A shutter speed, which is selectable in a case in which the shutter speed dial is rotated in the normal rotation direction R+ by an angle corresponding to two clicks, is displayed at the second next set value-display position Pn2. This shutter speed is 1/15 (sec.).

1 (sec.), which is the minimum value of a selectable shutter speed, is displayed at the minimum value-display position Pmin.

1/8000 (sec.), which is the maximum value of a selectable shutter speed, is displayed at the maximum value-display position Pmax.

Dots D of which the number corresponds to the number of shutter speeds thinned out are displayed between the set value-display position Po and the maximum value-display position Pmax. Since the shutter speeds thinned out are four shutter speeds of 1/500, 1/1000, 1/2000, and 1/4000 in the case of this example, four dots D are displayed between the set value-display position Po and the maximum value-display position Pmax.

Dots D of which the number corresponds to the number of shutter speeds thinned out are also displayed between the set value-display position Po and the minimum value-display position Pmin. Since the shutter speeds thinned out are three shutter speeds of ½, ¼, and ⅛ in the case of this example, three dots D are displayed between the set value-display position Po and the minimum value-display position Pmin.

As described above, the operation dial can also be used as the shutter speed dial.

In the example shown in FIG. 26, "Shutter Speed" is displayed at the center of the display section to clearly show that the operation dial functions as the shutter speed dial.

<Exposure Correction Dial>

FIG. 27 is a diagram showing an example of a display on the display section in a case in which the operation dial is used as an exposure correction dial.

FIG. 27 shows an example of a display on the exposure correction dial that can correct an exposure with a step width of ⅓ step. A width in which an exposure can be corrected has ±3 steps. In this case, the minimum value is −3 step and the maximum value is +3 step.

Further, FIG. 27 shows a case in which an exposure is not corrected. In this case, "0" is displayed at the set value-display position Po.

An exposure correction value, which is selectable in a case in which the exposure correction dial is rotated in the reverse rotation direction R− by an angle corresponding to one click, is displayed at the first previous set value-display position Pp1. This exposure correction value is +⅓.

An exposure correction value, which is selectable in a case in which the exposure correction dial is rotated in the reverse rotation direction R− by an angle corresponding to two clicks, is displayed at the second previous set value-display position Pp2. This exposure correction value is +⅔.

An exposure correction value, which is selectable in a case in which the exposure correction dial is rotated in the normal rotation direction R+ by an angle corresponding to one click, is displayed at the first next set value-display position Pn1. This exposure correction value is −⅓.

An exposure correction value, which is selectable in a case in which the exposure correction dial is rotated in the normal rotation direction R+ by an angle corresponding to two clicks, is displayed at the second next set value-display position Pn2. This exposure correction value is −⅔.

−3, which is the minimum value of a selectable exposure correction value, is displayed at the minimum value-display position Pmin.

+3, which is the maximum value of a selectable exposure correction value, is displayed at the maximum value-display position Pmax.

Dots D of which the number corresponds to the number of exposure correction values thinned out are displayed between the set value-display position Po and the maximum value-display position Pmax. Since the exposure correction values thinned out are six exposure correction values of +1, +1·⅓, +1·⅔, 2, +2·⅓, and +2·⅔ in the case of this example, six dots D are displayed between the set value-display position Po and the maximum value-display position Pmax.

Dots D of which the number corresponds to the number of exposure correction values thinned out are displayed between the set value-display position Po and the minimum value-display position Pmin. Since the exposure correction values thinned out are six exposure correction values of −1, −1·⅓, −1·⅔, 2, −2·⅓, and −2·⅔ in the case of this example, six dots D are displayed between the set value-display position Po and the minimum value-display position Pmin.

As described above, the operation dial can also be used as the exposure correction dial.

In the example shown in FIG. 27, "EXPOSURE CORRECTION" is displayed at the center of the display section to clearly show that the operation dial functions as the exposure correction dial.

<Volume Dial>

FIG. 28 is a diagram showing an example of a display on the display section in a case in which the operation dial is used as a volume adjustment dial, that is, a volume dial.

FIG. 28 shows an example of a display on the volume dial that can adjust volume by one step in the range of 0 to 100. In this case, the minimum value is 0 and the maximum value is 100.

FIG. 28 shows a case in which volume is set to "50". In this case, "50" is displayed at the set value-display position Po.

Volume, which is selectable in a case in which the volume dial is rotated in the reverse rotation direction R− by an angle corresponding to one click, is displayed at the first previous set value-display position Pp1. This volume is "51".

Volume, which is selectable in a case in which the volume dial is rotated in the reverse rotation direction R− by an angle corresponding to two clicks, is displayed at the second previous set value-display position Pp2. This volume is "52".

Volume, which is selectable in a case in which the volume dial is rotated in the normal rotation direction R+ by an angle corresponding to one click, is displayed at the first next set value-display position Pn1. This volume is "49".

Volume, which is selectable in a case in which the volume dial is rotated in the normal rotation direction R+ by an angle corresponding to two clicks, is displayed at the second next set value-display position Pn2. This volume is "48".

"0", which is the minimum value of selectable volume, is displayed at the minimum value-display position Pmin.

"100", which is the maximum value of selectable volume, is displayed at the maximum value-display position Pmax.

Dots D are displayed between the set value-display position Po and the maximum value-display position Pmax and between the set value-display position Po and the minimum value-display position Pmin. In the example shown in FIG. 28, a certain number of dots D are displayed at regular intervals. The number of dots D may be displayed according to the number of volumes thinned out.

As described above, the operation dial can also be used as the volume dial that is used to adjust volume.

In the example shown in FIG. 28, "volume" is displayed at the center of the display section to clearly show that the operation dial functions as the volume dial.

<<Switching of Functions Assigned to Operation Dial>>

The operation dial can be made to function as various operation dials as described above. Accordingly, the operation dial may be adapted so that assigned functions are randomly switched. For example, the operation dial may be adapted to be capable of being used as the sensitivity dial, the shutter speed dial, the exposure correction dial, and the volume dial as described above, and may be adapted to be randomly switched as necessary. In this case, the setting device is provided with a function switching unit that is used to switch the functions assigned to the operation dial. The function switching unit switches the functions, which are assigned to the operation dial, on the basis of an instruction output from the operation unit.

<<Display Position of Each Item to be Displayed on Display Section>>

In the above-mentioned embodiment, the maximum value-display position Pmax has been set at a position where the sensitivity dial 110 is rotated from the set value-display position Po in the normal rotation direction R+ by an angle of 135° and the minimum value-display position Pmin has been set at a position where the sensitivity dial 110 is rotated from the set value-display position Po in the reverse rotation direction R− by an angle of 135°. However, the maximum value-display position Pmax and the minimum value-display position Pmin are not limited thereto. It is preferable that the maximum value-display position Pmax and the minimum value-display position Pmin are appropriately set according to the size of the display section, or the like. The same applies to the first previous set value-display position Pp1, the second previous set value-display position Pp2, the first next set value-display position Pn1, the second next set value-display position Pn2, the previous set value-display position Pp, the next set value-display position Pn, and the like.

The set value-display position Po is set at the position corresponding to the indicator. The indicator has been disposed at a position corresponding to nine o'clock in the above-mentioned embodiment, but a position where the indicator is disposed can be appropriately selected according to a position where the operation dial is installed, or the like. Further, the shape of the indicator is not particularly limited, and can employ various shapes.

<<Rotation Direction of Operation Dial>>

In the above-mentioned embodiment, a clockwise direction has been set as the normal rotation direction in regard to the rotation direction of the operation dial. However, any direction can be appropriately selected as the normal rotation direction.

<<The Number of Selectable Set Values>>

The number of set values, which can be selected by the operation dial, is not particularly limited. However, it is preferable that the number of set values, which can be selected by the operation dial, is equal to or larger than the number of click positions of the operation dial per rotation. The invention more effectively acts as the number of set values, which can be selected by the operation dial, becomes larger than the number of click positions of the operation dial per rotation. The minimum value of the number of click positions per rotation is 1.

<<Other Examples of Display Section>>

The display unit body, which forms the display section of the sensitivity dial, has been formed of a reflective liquid crystal display in the above-mentioned embodiment, but an element of the display section is not limited thereto. Furthermore, the display unit body may be formed of, for example, electronic paper, a memory liquid crystal display, or the like.

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the display section can be confirmed even in a case in which the power supply of the camera is turned off.

Furthermore, a touch panel may be provided on the display surface of the display section. In a case in which the sensitivity setting device has a function to switch step widths, an instruction to switch step widths may be given using the touch panel. For example, the sensitivity setting device is adapted so that step widths are sequentially switched by an operation for touching the display surface. Even in a case in which the sensitivity setting device has a function to switch functions assigned to the operation dial, the functions may be switched using the touch panel.

Other Modification Examples

The rotation detection unit, which detects the rotation of the sensitivity dial, has been formed of a rotary encoder in the above-mentioned embodiment, but the structure of the rotation detection unit is not limited thereto. In addition, publicly known rotation detection means, which uses a rotary brush or the like, can also be used.

Further, the click mechanism has included the click groove-metal plate and the click balls in the above-mentioned embodiment, but the structure of the click mechanism is not limited thereto. In addition, publicly known click mechanism, which uses a leaf spring or the like, can also be used.

Furthermore, a case in which the invention is applied to a digital camera has been described by way of example in the above-mentioned embodiment, but the application of the invention is not limited thereto. The invention can be applied to a camera using a silver halide film likewise. In addition, the invention can also be applied to an electronic device in which a rotary operation dial is built.

Further, a case in which the invention is applied to a lens-interchangeable camera has been described by way of example in the above-mentioned embodiment, but the invention can also be applied to a camera, which is integrated with a lens, likewise.

Furthermore, a case in which the invention is applied to a non-reflex camera has been described by way of example in the above-mentioned embodiment, but the invention can also be applied to a reflex camera likewise.

Particularly, since a non-reflex digital camera has been being reduced in size and weight in recent years, a space where an operation dial can be installed is limited. Since sufficient operability can be ensured in the invention even though the operation dial is reduced in size, the invention particularly effectively acts in the non-reflex digital camera that is reduced in size and weight.

EXPLANATION OF REFERENCES

1: digital camera
2: lens
2a: lens drive unit
10: camera body
12: grip portion
14: lens mount
16: main display
18: sub-display
20: electronic view finder
20A: eyepiece portion
22: grip
24: thumb rest
30: shutter button
31: power supply lever
32: front command dial
35: illumination button
36: function button
37: first rear command dial
38: second rear command dial
39: selector buttons
40: menu button
41: cancel button
42: play button
43: delete button
44: imaging condition-setting button
50: image sensor
52: image sensor drive unit 54: shutter
56: shutter drive unit
58: analog signal processing section
60: image data input unit
62: work memory
64: data memory
66: digital signal processing section
68: recording control unit
70: main display drive unit
72: sub-display drive unit
74: operation unit
78: memory card
80: system controller
100: sensitivity setting device
110: sensitivity dial
110A: display section
112: indicator
114: rotation detection unit
114a: rotation detection unit
116: set sensitivity-switching unit
118: dial display control unit
120: display drive unit
122: sensitivity dial body
122A: body portion
122B: shaft portion
124: display unit
124A: display unit body
124B: strut part
126: sensitivity dial support frame
128: bearing
130: base plate
132: click mechanism
132A: click groove-metal plate
132B: click ball
132C: click spring
132a: click groove
134: click ball-receiving hole
140: step width changing unit
C: circle
D: dot
L: optical axis
Po: set value-display position
Pmax: maximum value-display position
Pmin: minimum value-display position
Pn: next set value-display position
Pp: previous set value-display position
Pn1: first next set value-display position
Pn2: second next set value-display position
Pp1: first previous set value-display position
Pp2: second previous set value-display position
R+: normal rotation direction
R−: reverse rotation direction
Sv: rotational speed
S1: first threshold value
S2: second threshold value
S10 to S17: procedure of processing for set sensitivity by sensitivity setting device
S20 to S29: procedure of processing in case in which step width is automatically switched according to rotational speed of sensitivity dial

What is claimed is:

1. A setting device comprising:
an operation dial that includes a click mechanism and is endlessly rotatable in a normal rotation direction and a reverse rotation direction;
a display section that is provided on an upper surface of the operation dial;
a rotation detection unit that detects a rotation of the operation dial;
a set value switching unit that switches set values in order between a minimum value that can be set and a maximum value that can be set according to the rotation of the operation dial; and
a display control unit that controls a display on the display section according to the switching of the set values performed by the set value switching unit,
wherein the display control unit displays a currently selected set value at a set value-display position,
the display control unit displays the maximum value that can be set at a maximum value-display position that is fixed on a downstream side of the set value-display position in the normal rotation direction in a case in which a number of the set values that are selectable between the currently selected set value and the maximum value that can be set is larger than a number of previous set value-display positions,
the display control unit displays the minimum value that can be set at a minimum value-display position that is fixed on an upstream side of the set value-display position in the normal rotation direction in a case in which a number of the set values that are selectable between the currently selected set value and the minimum value that can be set is larger than a number of next set value-display positions,
in a case in which the number of the set values that are selectable between the currently selected set value and the maximum value that can be set is equal to or smaller than the number of previous set value-display positions, a display position of the maximum value that can be set moves between the maximum value-display position and the set value-display position of the operation dial, according to the number of the set values that is equal to or smaller than the number of previous set value-display positions, and
in a case in which the number of the set values that are selectable between the currently selected set value and the minimum value that can be set is equal to or smaller than the number of next set value-display positions, a display position of the minimum value that can be set moves between the minimum value-display position and the set value-display position of the operation dial, according to the number of the set values that is equal to or smaller than the number of next set value-display positions.

2. The setting device according to claim 1,
wherein the display control unit displays dots between the set value-display position and the maximum value-display position in the normal rotation direction, and displays dots between the set value-display position and the minimum value-display position in the reverse rotation direction.

3. The setting device according to claim 2,
wherein the display control unit changes the number of the dots, which are displayed between the set value-display position and the maximum value-display position, according to the number of set values that are selectable between the currently selected set value and the maximum value, and changes the number of the dots, which are displayed between the set value-display position and the minimum value-display position, according to the number of set values that are selectable between the currently selected set value and the minimum value.

4. The setting device according to claim 1,
wherein the display control unit displays a certain number of set values, which are positioned ahead and are selectable in a case in which the operation dial is rotated in the reverse rotation direction, at the previous set value-display positions that are set on the downstream side of the set value-display position in the normal rotation direction, and displays the certain number of set values, which are positioned ahead and are selectable in a case in which the operation dial is rotated in the normal rotation direction, at the next set value-display positions that are set on the upstream side of the set value-display position in the normal rotation direction.

5. The setting device according to claim 4,
wherein the display control unit displays two set values, which are positioned ahead and are selectable in a case in which the operation dial is rotated in the reverse rotation direction, at the previous set value-display positions, and displays two set values, which are positioned ahead and are selectable in a case in which the operation dial is rotated in the normal rotation direction, at the next set value-display positions.

6. The setting device according to claim 1, further comprising:
a step width changing unit that changes a step width of switching of the set values.

7. The setting device according to claim 6,
wherein the step width changing unit changes the step width of switching of the set values according to a rotational speed of the operation dial.

8. The setting device according to claim 1,
wherein the display control unit displays the set value displayed at the set value-display position so that the set value displayed at the set value-display position is larger than set values displayed in other regions.

9. A camera comprising:
the setting device according to claim 1.

* * * * *